(12) United States Patent
Scherr

(10) Patent No.: US 7,369,969 B2
(45) Date of Patent: May 6, 2008

(54) HOLDING DEVICE FOR A SENSOR SIGNAL, METHOD FOR FORWARDING A SENSOR SIGNAL AND COMPUTER PROGRAM

(75) Inventor: Wolfgang Scherr, Landskron (AT)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 11/428,167

(22) Filed: Jun. 30, 2006

(65) Prior Publication Data

US 2007/0010967 A1    Jan. 11, 2007

(30) Foreign Application Priority Data

Jun. 30, 2005    (DE) .................. 10 2005 030 612

(51) Int. Cl.
*G06F 19/00* (2006.01)
*G06F 17/40* (2006.01)

(52) U.S. Cl. .............. 702/189; 702/85; 702/104; 714/1; 714/15; 714/100; 714/746; 714/747

(58) Field of Classification Search .......... 702/85, 702/104, 127, 182, 183, 184, 185, 189, 190, 702/191, 193; 714/1, 2, 3, 15, 20, 21, 22, 714/100, 746, 747

See application file for complete search history.

(56) References Cited

U.S. PATENT DOCUMENTS

| | | | | |
|---|---|---|---|---|
| 3,166,736 A | * | 1/1965 | Heminger ............... | 714/15 |
| 3,366,930 A | * | 1/1968 | Bennett et al. ........... | 375/351 |
| 3,465,300 A | * | 9/1969 | Maddox et al. ........... | 714/15 |
| 3,526,757 A | * | 9/1970 | Rees et al. ................ | 714/2 |
| 3,539,996 A | * | 11/1970 | Bee et al. ................. | 714/15 |
| 3,562,708 A | * | 2/1971 | Verbarg et al. ............ | 714/747 |
| 4,367,753 A | * | 1/1983 | Jirak ........................ | 600/521 |
| 4,975,883 A | * | 12/1990 | Baker et al. .............. | 365/185.23 |
| 5,881,128 A | * | 3/1999 | Lee ........................... | 379/1.01 |
| 6,239,586 B1 | * | 5/2001 | Fawcett et al. ........... | 324/76.65 |
| 6,242,900 B1 | * | 6/2001 | Fawcett et al. ........... | 324/76.65 |
| 6,243,652 B1 | * | 6/2001 | Fawcett et al. ........... | 702/65 |
| 6,246,934 B1 | * | 6/2001 | Otake et al. .............. | 701/35 |
| 6,349,101 B1 | * | 2/2002 | Yamashita ................ | 370/412 |

(Continued)

FOREIGN PATENT DOCUMENTS

DE   10 2004 014728 A1   11/2004

(Continued)

*Primary Examiner*—Edward R Cosimano
(74) *Attorney, Agent, or Firm*—Eschweiler & Associates, LLC

(57) ABSTRACT

A holding device for a sensor signal comprises a signal input receiving a sensor signal, a signal output and a storage device coupled to the signal input and output. The storage device is designed to store a signal value in a first state and to update it based on the sensor signal in a second state. The storage device stores the signal value for a time period which is greater than a first predetermined time duration, independently of a supply voltage of the storage device. The holding device outputs the signal value present in the storage device. The holding device furthermore comprises a monitoring device, which is effectively coupled to the storage device and determines whether the sensor signal present at the signal input is valid. The monitoring device ensures that the storage device is in the second state only when the monitoring device identifies that the sensor signal is valid.

37 Claims, 11 Drawing Sheets

U.S. PATENT DOCUMENTS

| | | |
|---|---|---|
| 6,389,556 B1 * | 5/2002 | Qureshi ........................ 714/15 |
| 6,598,197 B1 * | 7/2003 | Peterson et al. ............. 714/763 |
| 7,098,799 B2 | 8/2006 | Imai et al. ................... 340/660 |
| 2002/0136207 A1 * | 9/2002 | Matsumoto et al. ......... 370/352 |
| 2007/0006057 A1 * | 1/2007 | Wallner et al. .............. 714/763 |
| 2007/0010967 A1 * | 1/2007 | Scherr ........................ 702/182 |

FOREIGN PATENT DOCUMENTS

EP             1 452 475 A1     9/2004

* cited by examiner

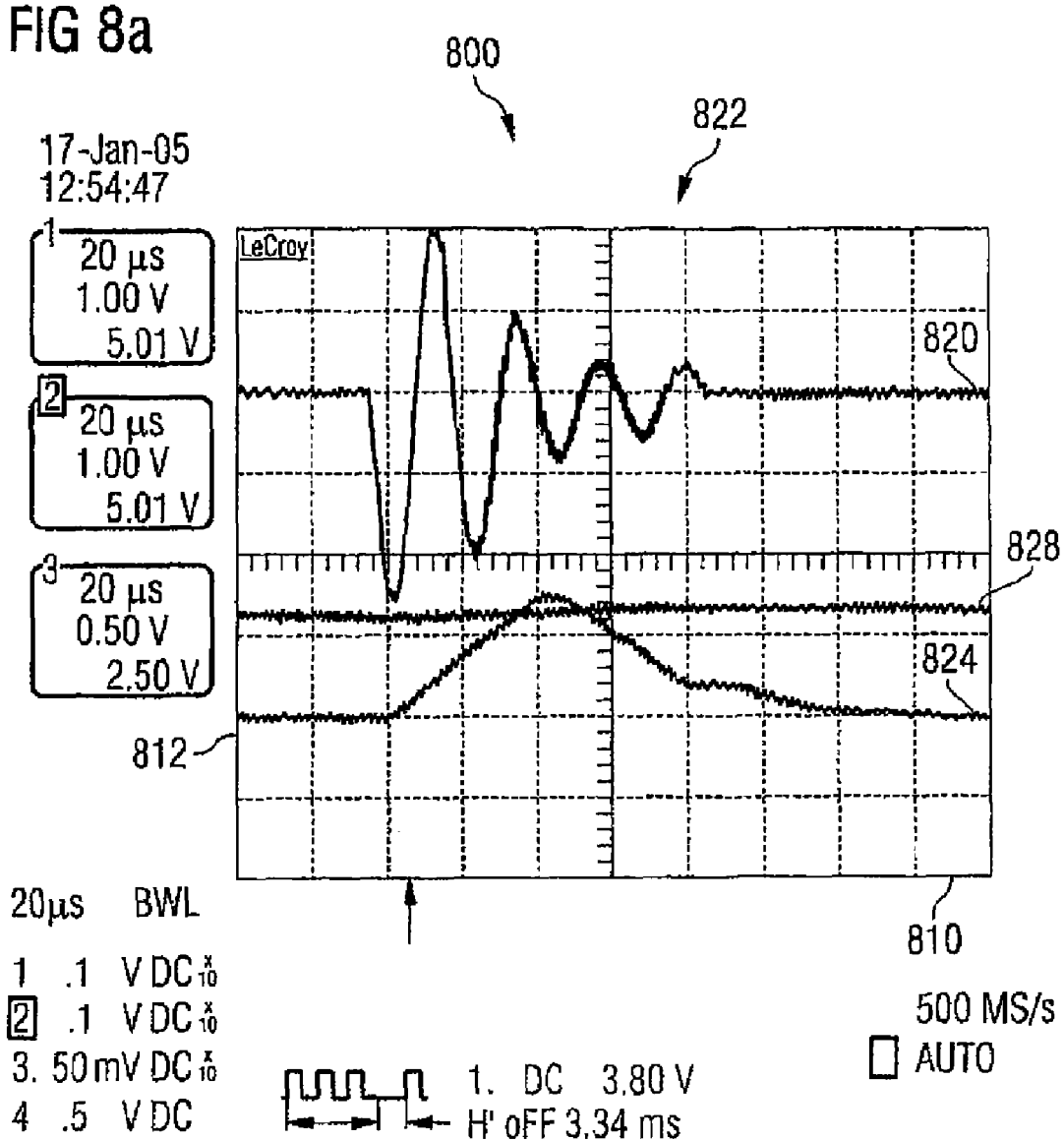

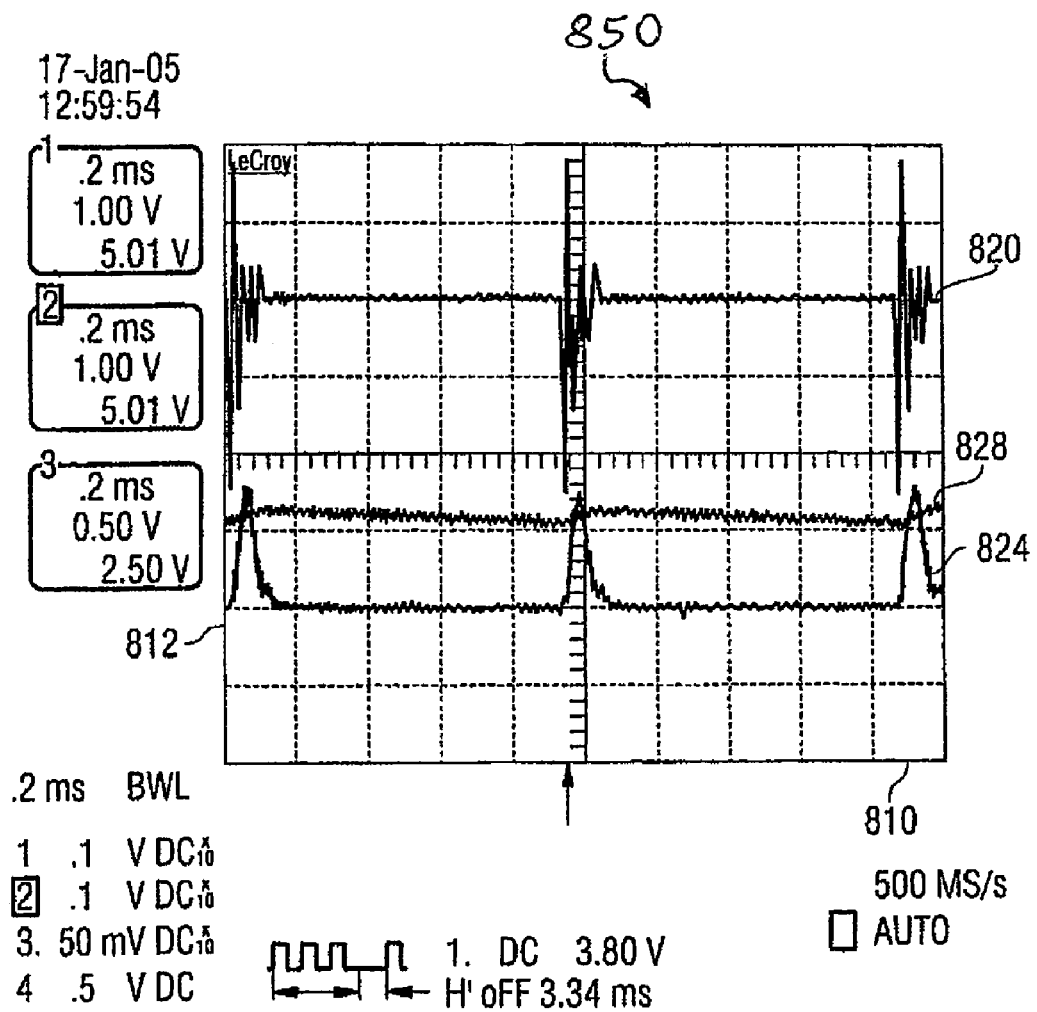

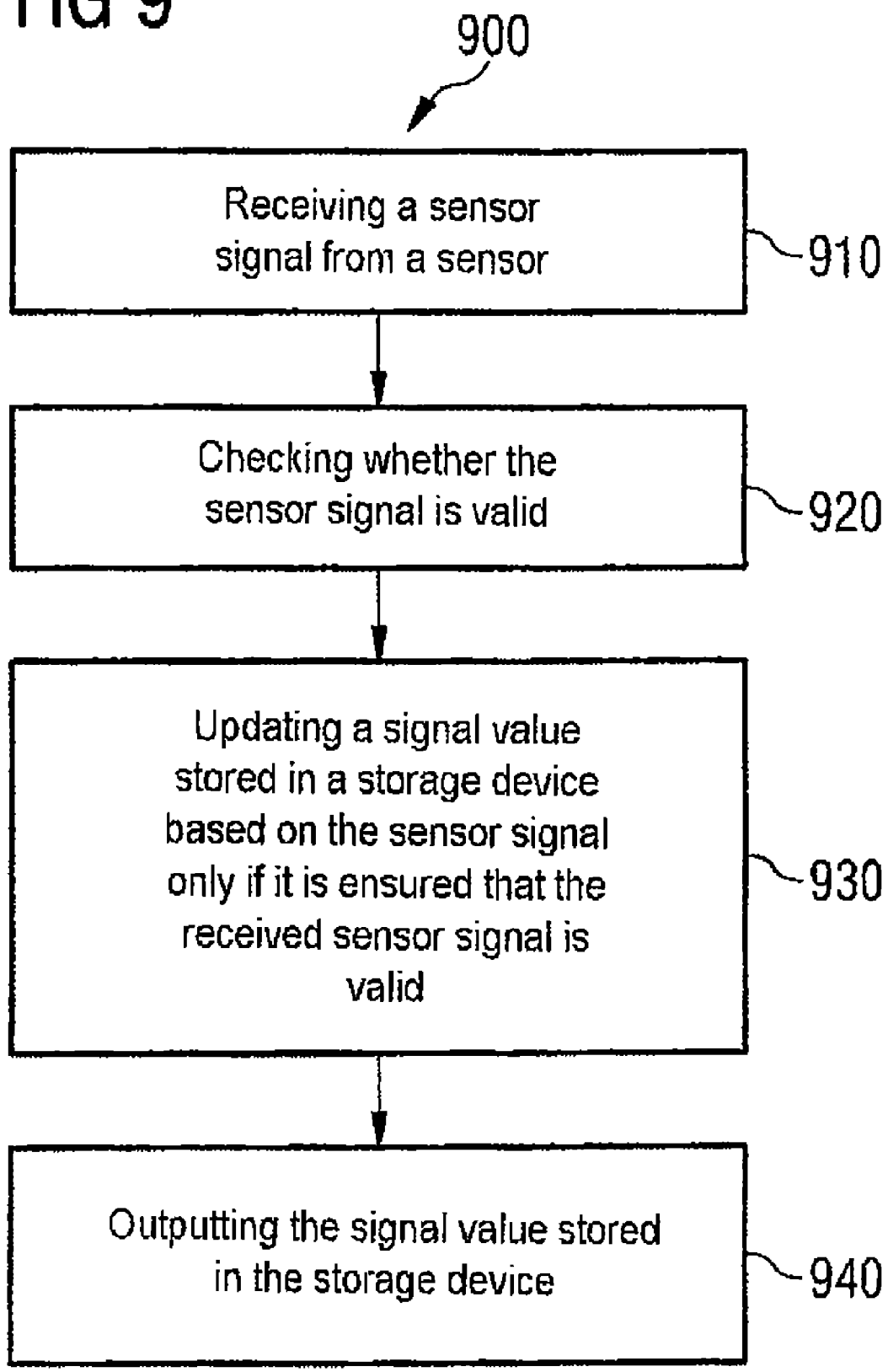

US 7,369,969 B2

HOLDING DEVICE FOR A SENSOR SIGNAL, METHOD FOR FORWARDING A SENSOR SIGNAL AND COMPUTER PROGRAM

PRIORITY

This application claims priority from German Patent Application No. 10 2005 030 612.8-35, which was filed on Jun. 30, 2005, and is incorporated herein by reference in its entirety.

TECHNICAL FIELD

The present invention relates generally to a holding device for a sensor signal, a method for forwarding a sensor signal and a corresponding computer program, specifically to a holding device, a method and a computer program for suppressing disturbances in sensor systems.

BACKGROUND

The present invention is concerned with the reliable detection of measurement quantities from a given process and the forwarding thereof to a superordinate system for an arbitrary application. FIG. 10 shows a schematic diagram of a data acquisition system in accordance with the prior art, which may also be referred to as a sensor. The data acquisition system is designated in its entirety by 1000. In this case, the data acquisition system 1000 comprises a process 1010 to be monitored. A sensor element 1020 detects a measurement quantity 1024 of the process 1010 to be monitored. The sensor element 1020 furthermore forwards one or more electrical quantities 1028 to a data conditioning 1030. The data conditioning 1030 generates measurement data 1034 based on the at least one electrical quantity 1028 and forwards said measurement data to an interface 1040. The interface 1040 conditions the measurement data 1034 for further processing by a superordinate arrangement (not shown here). The forwarding of the data from the interface 1040 to the superordinate arrangement is indicated by an arrow 1050.

It should be pointed out in this case that different types of sensors are used in practice. Thus, there are sensors with an external sensor element, in the case of which the sensor element 1020 is separate from the data conditioning 1030 and the interface 1040. By way of example, the sensor element 1020 may be arranged spatially separate from the data conditioning 1030 and the interface 1040. On the other hand, sensors with an integrated sensor element are also customary, sensor element, data conditioning and interface being regarded as one unit (as the sensor). By way of example, it is possible for the sensor element 1020, the data conditioning 1030 and the interface 1040 to be monolithically integrated.

In the system under consideration (the data acquisition system 1000), the sensor element 1020 can detect an arbitrary measurement quantity 1024 from the given process 1010—directly or indirectly, actively or passively. It is pointed out, moreover, that the sensor element 1020 can of course also detect a plurality of arbitrary measurement quantities 1024. In general, the resulting quantities are available as electrical signals or electrical quantities 1028 for further processing in the data conditioning 1030.

In integrated sensor systems, but perfectly well in discretely constructed systems, too, the three function blocks sensor element 1020, data conditioning 1030 and interface 1040 may be regarded as a common unit—the "sensor".

However, systems also exist which have jointly operated data conditioning 1030 and interface 1040, which acquire electrical quantities 1028 from an external sensor element 1020 and thus form a sensor-data conditioning system.

Irrespective of whether the sensor element is fixedly connected to the data conditioning 1030 and the interface 1040, the expression "sensor" is used in this case for all the possibilities described in the rest of the description. In other words, the expression "sensor" designates for example the combination of a sensor element 1020 with a data conditioning 1030 and an interface 1040. Equally, the expression "sensor" designates the combination of a data conditioning 1030 for a sensor element in conjunction with a suitable interface 1040 even when the sensor element 1020 is indeed not coupled to the data conditioning 1030, or obtains the electrical quantities or measurement data in turn from an upstream data processing unit.

It may thus be emphasized that hereinafter systems which have jointly operated data conditioning and interface which acquire electrical quantities from an external sensor element (for instance in the form of a sensor-data conditioning system) are also designated as sensor. In other words, generally referring to the possibility described here, the expression "sensor" is quite generally used hereinafter.

The behaviour of a sensor taking account of interference influences is of crucial importance in application technology. Ideally, even given the presence of an external disturbance which may be caused for example by an electromagnetic coupling, a problem of electromagnetic compatibility (EMC) or by a supply voltage dip, a sensor should forward correct measurement data to the superordinate system without any impairment.

It is advantageous if a sensor can at least identify a disturbance. Thus, sensors are often equipped with monitoring circuits in order to indicate a possible error behaviour to a superordinate system to which the respective sensor is coupled. By way of example, a sensor may concomitantly measure its own supply voltage and forward a signal in the event of limit values being exceeded or undershot. This functionality is often referred to as "overvoltage/undervoltage detect".

The problem in conventional sensor systems is that a disturbance can influence the evaluation circuit (data conditioning 1030) and the interface circuit (interface 1040) insofar as a reinitialization or a time-intensive normalization of the sensor data are required. During the reinitialization or the time-intensive normalization, the sensor data or output data supplied to the superordinate system are no longer valid and therefore also unusable for a specific time. By way of example, the output data, on account of an internal low-pass filter behaviour after a disturbance or a reinitialization or normalization of the sensor data, must first return to an initial situation again. In other words, the sensor must first settle again after a disturbance.

FIG. 11 shows a schematic illustration of a simple sensor system having three terminals. The sensor system shown in FIG. 11 is designated in its entirety by 1100. The heart of the sensor system 1100 is a sensor 1110. The sensor 1110 is designed to detect a measurement quantity 1120. Furthermore, the sensor 1110 is coupled to a reference potential GND and a supply potential 1130 for voltage supply purposes. Output data 1144 are present at an output 1140 of the sensor 1110. The output data 1144 are based on the measurement quantity 1120 and are furthermore dependent on the voltage supply of the sensor 1110, that is to say a voltage between the supply potential 1130 and the reference potential GND.

FIG. 12 shows a graphical illustration of the output data of exemplary sensor systems in accordance with the prior art as a response to a disturbance of the voltage supply. The graphical illustration of FIG. 12 is designated in its entirety by 1200. A first temporal illustration 1210 describes the supply voltage that supplies the sensor 1110, as a function of time. Consequently, the time is plotted on an abscissa 1212. An ordinate 1214 shows the supply voltage of the sensor 1110, that is to say the difference between the supply potential 1130 and the reference potential GND. A first curve 1216 describes a temporal profile of the supply voltage. The first temporal illustration 1212 furthermore shows a dip 1218 in the supply voltage, which represents a disturbance of the voltage supply.

A second temporal illustration 1230 describes the output data 1144 of an exemplary sensor 1110 as a function of time. The second temporal illustration 1230 consequently shows a first possible reaction of an exemplary sensor 1110. An abscissa 1232 of the second temporal illustration 1230 once again describes the time. An ordinate 1234 furthermore describes the output data 1144 of an exemplary sensor 1110. A second curve 1236 describes a temporal profile of the output data 1144 at the output 1140 of the exemplary sensor 1110. Reference is made here to the fact that the output data 1144 may be present as an analogue signal or as a digital signal. The second temporal illustration 1230 shows the magnitude of such an output signal. It can be discerned from the second temporal illustration 1230 that the output data shown by the second curve 1236 have a dip 1238 that is effected approximately at the same time as the dip 1218 in the supply voltage as shown in the first temporal illustration. Furthermore, the second temporal illustration 1230 shows a start-up 1240 of the output data 1144 of the exemplary sensor 1110. In other words, after the dip 1238 in the output data 1144, the output data assume a high value again, which is approximately equal to the value of the output data prior to the dip 1238, only for a short time before thereupon returning to zero. During the start-up 1240, the output data 1144 then slowly move back to an original value that was present prior to the dip 1238.

A third temporal illustration 1250 shows a further exemplary profile of the output data 1144 of an exemplary sensor 1110. In other words, the third temporal illustration 1250 describes a second possible reaction of an exemplary sensor 1110 to a dip 1218 in the voltage supply. An abscissa 1252 of the third temporal illustration 1250 again describes the time. By contrast, an ordinate 1254 of the third temporal illustration 1250 shows the output data 1144 of the exemplary sensor 1110. A third curve 1256 describes the temporal profile of the output data.

The third curve 1256 shows a dip 1258 in the output data which takes place approximately at the same time as the dip 1218 in the supply voltage. Shortly after the dip 1258 in the output data 1144, the output data again assume the value prior to the dip 1258. However, an attenuated-oscillating start-up 1260 follows, during which the output data 1144 oscillate about the final value. A constant final value is then assumed again after a specific time duration.

In other words, the graphical illustration 1200 shows two possible behaviours of sensors with an output voltage that is ratiometric with respect to the supply on account of a supply voltage dip 1218.

In both cases shown in the second temporal illustration 1230 and the third temporal illustration 1250, the output data (or the output) firstly follow the dip 1218 in the supply voltage. This is to be expected since a ratiometric sensor is assumed here, in the case of which the output voltage for a fixed value of the measurement quantity 1120 is proportional to the supply voltage. In both cases shown, internal function blocks of the sensor have to be reinitialized as a safety feature since the dip 1218 in the supply voltage is so great that this could lead to functional inconsistencies. Especially if a sensor or sensor system may only be equipped with few control lines, it may be problematic to forward this state (that is to say the reinitialization of the function blocks) towards the outside.

In the case of the first reaction shown in the second temporal illustration 1230, a restart (or a reinitialization of the function blocks of the sensor) is followed by a visible start-up 1240 of the output voltage that is illustrated by the second curve 1236. It should be noted here that the output voltage essentially corresponds to the output data. As shown in the third temporal illustration 1250, an attenuated-oscillating start-up 1260 may also follow in the case of a second possible reaction of the output data (output voltage) as a reaction to a disturbance (dip) of the voltage supply in the case of a restart (reinitialization of the function blocks of the sensor). The type of behaviour after the restart or the reinitialization of the function blocks of the sensor generally depends on the underlying function and conception of the sensor system. Consequently, the behaviours described are also to be regarded only by way of example; arbitrary other signal shapes between the disturbance and the recovered state are also conceivable on account of the diverse possibilities of the detailed construction of a sensor system.

Furthermore, it should be noted that the frequency of digital signal evaluation is increasing precisely in modern sensor systems. This is because a digital signal evaluation affords at least two important advantages. Thus, a digital signal evaluation enables a deterministic processing of implemented algorithms and methods. Furthermore, a digital signal evaluation opens up an efficient and simple possibility for testing the corresponding function blocks at the end of a production line.

However, digital circuits are difficult to assess in terms of their interference behaviour with regard to diverse disturbances. Equally, measures for eliminating the problems described can be assessed only with difficulty in the case of digital circuits.

Known measures for improving the behaviour of sensors given the presence of external disturbances are described briefly below. The most important and best means for minimizing the problem of interference influencing has hitherto been to make a sensor system itself robust by providing a stable voltage supply and through suitable measures for interference filtering in order to keep the thresholds for the identification and triggering of a reaction to a disturbance, that is to say e.g. a start-up or reinitialization of function blocks of the sensor, as low as possible.

Furthermore, it is possible to make the start-up as short as possible by means of suitable techniques. In analogue circuit technology, attempts may also be made to buffer voltages (and if appropriate currents) to an extent such that a completely new start-up is prevented.

However, it should be pointed out that especially when using digital evaluation methods, digital filters and similar digital circuits, a sufficiently disturbance-immune design has not been possible hitherto, which makes a complete start-up essential in the case of disturbance. This is because a voltage dip during a clock edge of a digital system may lead to unforeseeable reaction. By way of example, counters may miscount. Moreover, data may be stored incompletely in the event of a disturbance of a digital circuit.

The abovementioned measures for improving the interference immunity of sensors therefore do not permit a complete suppression of disturbances to be realized. Rather, in conventional sensors there are a multiplicity of cases of interference which do not satisfy the desire for total suppression of interference events.

SUMMARY

A holding device is provided for a sensor signal from a sensor which makes it possible to supply at a signal output an output signal which is based on the sensor signal and in which interference components caused by disturbances on the supply voltages are minimized.

In accordance with one embodiment, a holding device for a sensor signal from a sensor, comprises: a signal input for receiving the sensor signal from the sensor; a signal output; a memory, which is coupled to the signal input and the signal output, is designed to store a signal value in a first state, is designed to update the signal value based on the sensor signal in a second state, and is furthermore designed to store the signal value for a time period that is greater than a first predetermined time duration, independently of a supply voltage of the memory; and a monitor, which is effectively coupled to the memory, and is designed to determine whether the sensor signal present at the signal input is valid, and to ensure that the memory is in the second state only when the monitor identifies that the sensor signal at the signal input is valid, wherein the holding device is furthermore formed to output the signal value present in the memory at the signal output.

In accordance with one embodiment, a method for forwarding a sensor signal using a memory formed to store a signal value for a time period which is longer than a predetermined first time duration, independently of a supply voltage of the memory, comprises the steps of: receiving the sensor signal from a sensor; checking whether the sensor signal is valid; updating the signal value stored in the memory based on the sensor signal only if it is ensured that the received sensor signal is valid; and outputting the signal value stored in the memory.

In accordance with one embodiment, a computer program product has a program code for carrying out, when the computer program is executed on a computer, a method for forwarding a sensor signal using a memory formed to store a signal value for a time period which is longer than a predetermined first time duration, independently of a supply voltage of the memory, with the steps of: receiving the sensor signal from a sensor; checking whether the sensor signal is valid; updating the signal value stored in the memory based on the sensor signal only if it is ensured that the received sensor signal is valid; and outputting the signal value stored in the memory.

BRIEF DESCRIPTION OF THE DRAWINGS

These and other objects and features of the present invention will become clear from the following description taken in conjunction with the accompanying drawings, in which:

FIG. 8a shows a graphical illustration of measurement results on a sensor system with a holding device;

FIG. 8b shows a graphical illustration of measurement results on a sensor system with a holding device;

FIG. 9 shows a flowchart of a method according in accordance with a fourth exemplary embodiment;

DETAILED DESCRIPTION

Figure 1:
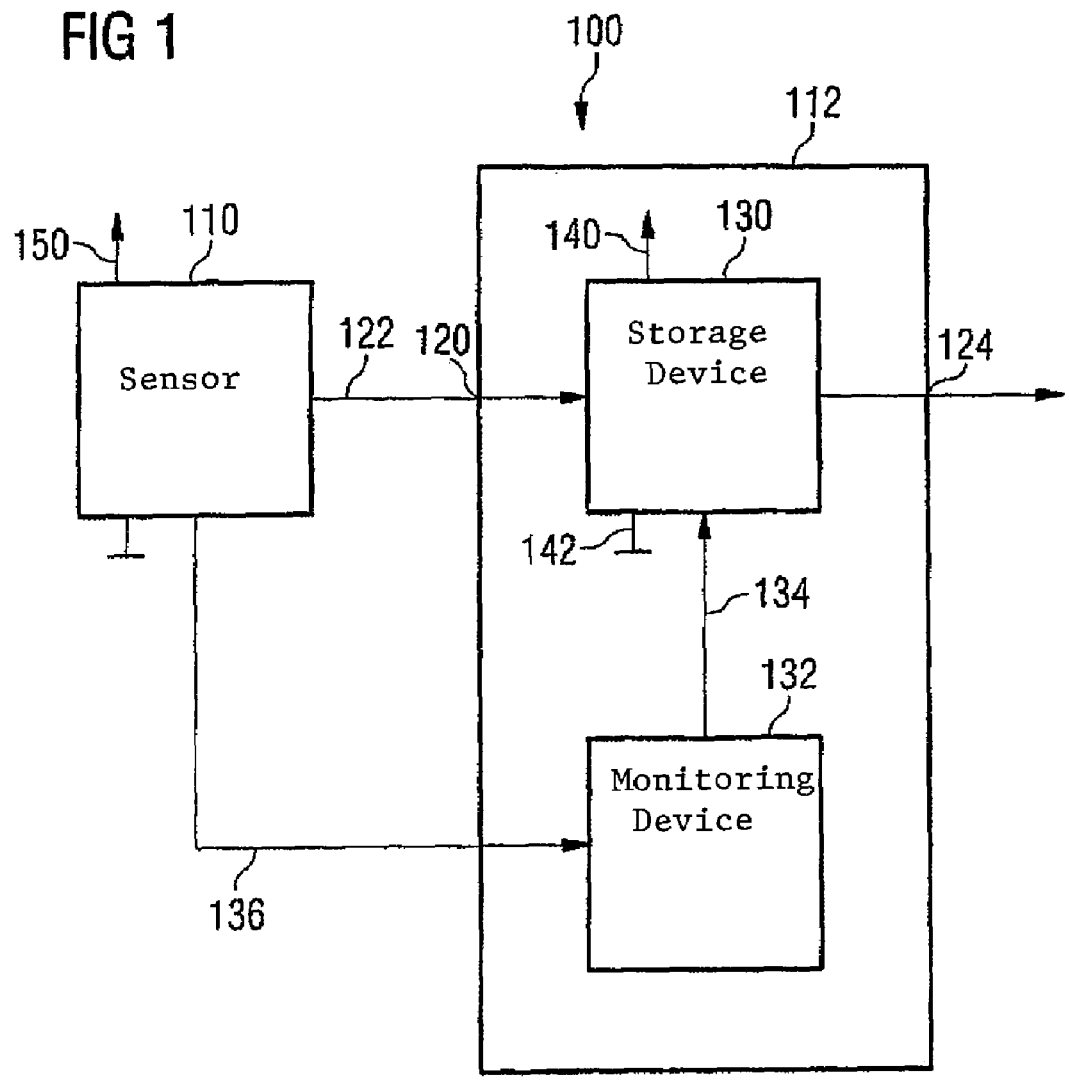
FIG. 1 shows a block diagram of a sensor system with a holding device in accordance with a first exemplary embodiment.

A holding device may be provided for a sensor signal from a sensor having a signal input for receiving the sensor signal from the sensor and a signal output. The holding device furthermore may comprise a storage device, which is coupled to the signal input and the signal output, is designed to store a signal value in a first state, and is furthermore designed to update the signal value based on the sensor signal in a second state. The storage device can furthermore be designed to store the signal value for a time period which is greater than a predetermined first time duration, independently of a supply voltage of the storage device. The holding device can be designed to output the signal value present in the storage device at the signal output. Furthermore, the holding device may comprise a monitoring device, which is effectively coupled to the storage device and is designed to determine whether the sensor signal present at the signal input is valid, and to ensure that the storage device is in the second state only when the monitoring device identifies that the sensor signal at the signal input is valid.

A basic concept is that it may be advantageous to forward a sensor signal from a sensor to a downstream circuit only when the sensor signal from the sensor is actually valid, and that it can be furthermore particularly advantageous, in the case of an invalid sensor signal, to retain a signal value based on the last valid sensor signal and to provide it at a signal output for subsequent processing. In other words, the holding device can be designed to identify by means of the monitoring device whether the sensor signal at the signal input is valid. If the sensor signal at the signal input is valid, the storage device can be updated based on the sensor signal in the second state. However, if the monitoring device identifies that the sensor signal at the signal input of the holding device is not valid, then the storage device may store the last valid signal value in the first state. Accordingly, the last valid signal value of the sensor signal received by the holding device may always be present at the signal output. However, if a disturbance occurs in the sensor, which may be caused for example by a fluctuation of a supply voltage of the sensor, then the holding device can identify that the sensor signal is invalid and accordingly cause the storage device to retain the last valid signal value.

Furthermore, it can be emphasized that the storage device can be designed to store the stored signal value for a certain time independently of the supply voltage of the storage device. The storage device thus retains the stored signal value even when the supply voltage of the sensor exhibits a dip, so that signal values in other digital circuits, for example the evaluation device, are lost. Furthermore, the holding device may have the effect that no unreliable or incorrect measured values are forwarded during a start-up of the sensor (or a data conditioning device of the sensor) in exactly the same way as during a disturbance of the sensor. Rather, the last valid measured value is available at the signal output of the holding device since the monitoring device of the holding device can identify that the sensor signal supplied by the sensor is invalid during the start-up of the sensor (or during a reinitialization of the sensor). Consequently, the holding device may forward measurement data from the sensor again only when the start-up of the sensor (or the reinitialization of the sensor) after a disturbance has ended and the sensor signal supplied by the sensor is thus accepted as valid.

It has furthermore been recognized that in a large number of sensors, the start-up of the sensor (or the reinitialization of the data conditioning contained in the sensor) can be effected rapidly compared with an alteration of the measurement data. In this case, the holding device may entail the advantage that correct or approximately correct measured values are always present at the signal output of the holding device. If a disturbance occurs which forces the sensor or the data conditioning contained in the sensor to effect a restart, then the holding device may interrupt the updating of the storage device. The holding device thus may output the last valid measurement data at the signal output even after a momentary failure of the supply voltage (of the sensor and, if appropriate, also of the storage device). Thus, while in a short time interval after a disturbance the sensor signal is disturbed on account of the start-up of the sensor, a temporally constant signal that is very close to the actual measured value is present at the signal output of the holding device. As soon as the sensor operates reliably again, that is to say supplies a reliable and thus valid sensor signal, the sensor signal can be again forwarded to the output of the holding device. Disturbances of the sensor signal which arise as a result of the start-up or reinitialization of the sensor can thus be suppressed at the signal output of the holding device. The holding device rather may supply a constant signal in the case of a disturbance of the sensor. There, the signal at the signal output of the holding device, in the event of a momentary dip in the supply voltage, can be disturbed only for the short time of the dip, but not beyond that.

A holding device may entail a series of significant advantages. As already described, by means of a holding device in conjunction with a sensor it can be ensured that an approximately correct measurement signal is always present at the signal output of the holding device. Artefacts that may be generated as a result of a start-up of the sensor are suppressed at the signal output of the holding device. Even in the event of a voltage dip, a correct output signal can be present at the signal output of the holding device immediately after the recovery of the voltage supply, rather than only after a start-up of the sensor—which is what is customary in the case of conventional sensors. Consequently, oscillations and a transient recovery behaviour of the sensor can be suppressed at the signal output of the holding device and cannot disturb a further processing device connected to the sensor.

Furthermore, the use of a holding device may enable the disturbance behaviour of a sensor system comprising a sensor and the holding device to be determined essentially by the characteristic of the holding device. If the holding device can reliably identify cases of disturbance which make the sensor signal invalid, and can furthermore reliably store the valid signal value in the storage device, then the output behaviour of the sensor system comprising the sensor and the holding device can be defined solely thereby. Consequently, in the case of a circuit design, only the disturbance behaviour of the holding device may be critical as long as in the rest of the sensor circuit it is possible to identify when a sensor signal is invalid. In other words, in the design of a sensor system, only the storage device for holding the last valid signal value may have to be implemented in a manner immune to interference. All examinations and observations during a case of interference can be concentrated on the storage device.

Furthermore, the monitoring of a sensor system with a holding device can be carried out completely independently of the sensor. Rather, arbitrary quantities of the sensor system can be taken into consideration, it being advantageous, of course, to monitor for example the operating voltage of the sensor. In addition, it is possible, of course, to identify abnormal profiles of the sensor signal supplied by the sensor, from which it can likewise be concluded that the sensor signal is invalid.

Furthermore, it must be emphasized that the determination of whether a sensor signal is valid can be effected on the basis of simple criteria. Thus, it is possible for example for the monitoring device to check whether the supply voltage of the sensor lies within a valid range. Furthermore, the monitoring device may interrogate whether the sensor is in a reset state. Further self-diagnosis devices of the data conditioning may, of course, also be evaluated. The circuitry outlay for the monitoring device can thus be kept very low.

In one exemplary embodiment, the monitoring device is designed to identify the sensor signal as invalid whenever a supply voltage of the sensor has a disturbance. Consequently, the monitoring device preferably monitors at least one operating voltage of the sensor. Furthermore, it is assumed here that a fluctuation of the operating voltage of the sensor which exceeds a certain tolerance range results in an invalid sensor signal. It should be noted in this case that an analogue circuit in the sensor essentially reacts sensitively to slow changes in the supply voltage, while digital circuit parts in the sensor are disturbance-susceptible to short dips or overvoltage spikes on the supply voltages (that is to say fast alterations). Accordingly, the monitoring device may be designed to identify precisely such disturbances from the supply voltage which impair proper operation of the sensor and thus result in impermissible or invalid sensor signals.

In a further preferred exemplary embodiment, the monitoring device is designed to identify a sensor signal as invalid whenever the sensor signal has a temporal change which is faster than a predetermined temporal change. Such an evaluation is expedient if it can be assumed that the sensor signal changes only slowly during proper operation of the sensor. This slow change in the sensor signal may be determined for example by means of the measurement quantity to be monitored, the rate of change of which lies, of course, in a physically practical range. A very fast change in the sensor signal thus indicates a disturbance of the sensor, for example as a result of a dip in the operating voltage or as a result of some other invalid sensor state. Consequently, it is possible to ascertain the validity of the sensor signal purely on the basis of the sensor signal itself, so that, by way of example, it is not necessary to access the supply voltage of the sensor for monitoring.

In a further preferred exemplary embodiment, the storage device is furthermore designed to set the signal value to a predetermined precharge value as a response to a precharge signal. In other words, the storage device is a prechargeable storage device. The precharging of the storage device is desirable for example in order to set the storage device to a defined initial value if the sensor and thus also the holding device are put into operation again after a relatively long interruption of operation. This is because in the case of a relatively long interruption of operation, it is to be expected that the signal value stored in the storage device is no longer valid. This may be the case for example if an interruption of operation of the sensor is so long that the measurement quantity may have altered greatly during the interruption of operation. Furthermore, in some embodiments, the storage device loses the stored signal value after a time which is greater than the first predetermined time duration. In this case, too, it is necessary to precharge the storage device to an initial value. Finally, it should be mentioned that the precharge value is preferably chosen such that it indicates to a processing device connected to the signal output of the holding device that the holding device has been reset to the precharge value. The precharge value is thus preferably a value which does not occur during normal operation of the sensor and the holding device. Rather, the precharge value is preferably suitable for communicating to an evaluation device connected to the signal output of the holding device that the holding device is not currently outputting a valid measured value.

In a further preferred exemplary embodiment, the storage device is designed to store the signal value independently of interference pulses on the supply voltage of the storage device. It is thus preferred for the storage device to be designed in a manner immune to interference. This is advantageous since it is precisely the task of the storage device to store a signal value even when disturbances are present from at least one supply voltage line for the sensor. Since, in order to minimize a cabling outlay, the holding device is preferably supplied with electrical energy via the same power supply line or the same power supply lines as the sensor, it can be assumed that disturbances on the supply voltage of the sensor are simultaneously manifested as disturbances on the supply voltage of the holding device. While it is very difficult, however, to construct the entire sensor including an analogue and a digital signal processing device or data conditioning device in a manner immune to interference, it is possible without major problems to design the holding device in a manner immune to interference. This is because the holding device comprises only a small number of components. Moreover, the central requirement made of the storage device is to store a signal value reliably and independently of disturbances (e.g. voltage dips or overvoltage spikes) on the supply voltage. Accordingly, the storage device can be optimized for this purpose, while the data conditioning typically executes substantially more complex functions (e.g. calculation functions, filter functions or normalization functions) and therefore cannot be optimized in a simple manner with regard to interference immunity.

If the storage device is designed to store the signal value independently of interference pulses on the supply voltage, then examinations of cases of interference can also be concentrated on the storage device, while the data conditioning device can essentially be disregarded.

In a further exemplary embodiment, the monitoring device is designed to monitor whether the sensor has a disturbance, and to ensure that the storage device is in the second state only when the sensor has no disturbance. Such a design of the monitoring device is advantageous since it can thereby be ensured that a sensor signal is forwarded from the signal input of the holding device to the signal output of the holding device only when the sensor has no disturbance, that is to say supplies a reliable and valid signal. In order to determine whether the sensor has a disturbance, the monitoring device may for example use a signal from a self-diagnosis device of the sensor. Such a self-diagnosis device is already present in many modern sensors. Thus, the sensor may monitor for example whether a signal processing device present in the sensor is operating properly. It is possible, for example, to monitor a correct processing of a program by means of a so-called watchdog timer. Moreover, the storage contents of registers and other storage units in the sensor may be continuously checked with regard to their validity by means of parity bits or check bits. In addition, a data conditioning device in the sensor may also monitor whether values supplied by the sensor element are valid. If, by way of example, the data conditioning device in the sensor identifies that an electrical signal from a sensor element is disturbed, then the data conditioning device of the sensor may pass on the report of a disturbance to the holding device, and the holding device may in this case prevent an updating of the signal value stored in the storage device, so that the signal output of the holding device has the constant value until the error case has been eliminated.

It is furthermore preferred for the monitoring device to be designed to monitor at least one operating voltage of the sensor, and to ensure that the storage device is in the second state only when the at least one operating voltage of the sensor is in a permissible operating voltage range. In the second state, the storage device permits an updating of the signal value, so that the sensor signal can be forwarded from the signal input of the holding device to the signal output of the holding device. A permissible operating voltage range may in this case be an interval between a lower permissible operating voltage value and an upper permissible operating voltage value. It is equally possible to define only a lower limit for the permissible operating voltage. Furthermore, it is possible to design the monitoring device such that it only identifies those dips or spikes of the operating voltage which are longer than a predetermined time duration. This is expedient for example if the sensor comprises an essentially analogue data conditioning that can tolerate momentary disturbances of the operating voltage. On the other hand, however, the monitoring device may also be designed to identify even very short dips or spikes on the voltage supply of the sensor since digital circuits often react very sensitively to short dips in the supply voltage.

It is furthermore possible for the sensor to have separate operating voltages for an analogue circuit part a digital circuit part. In this case, it may be expedient to adapt the monitoring of the operating voltage to the respective circuit part, thereby ensuring that the monitoring device identifies those fluctuations of the operating voltage(s) of the sensor in the case of which the sensor does not supply a reliable sensor signal. It is furthermore preferred for the monitoring device to be designed such that the monitoring device identifies disturbances on the operating voltages of the sensor when and only when reliable operation of the sensor is no longer ensured. This prevents the situation in which the monitoring device responds more often than absolutely necessary, assumes an invalid sensor signal and prevents the forwarding of the sensor signal from the signal input of the holding device to the signal output of the holding device.

It is furthermore preferred for the monitoring device to be designed to monitor an operating voltage of the sensor and to put the storage device immediately into the first state if a disturbance occurs on the operating voltage of the sensor, and to hold the storage device in the first operating state for a second predetermined time after the end of the disturbance on the operating voltage of the sensor. This is because it must be assumed that a sensor signal is invalid immediately after the disturbance occurs. Consequently, the monitoring device is designed to prevent an invalid sensor signal from being forwarded from the signal input of the holding device to the signal output of the holding device. It is advantageous if the monitoring device responds more rapidly than the data conditioning device of the sensor makes a new sensor signal available to the signal input of the holding device. This reliably prevents an unreliable or invalid sensor signal from being forwarded to the holding device. Moreover, it must also be assumed that after the end of the disturbance on the operating voltage of the sensor, the sensor does not immediately supply a valid sensor signal. Rather, a transient recovery of the sensor or a reinitialization of the sensor is usually required. Consequently, the sensor requires a certain time before it supplies a reliable sensor signal again after the end of the disturbance on the operating voltage. The second predetermined time, for which the monitoring device holds the storage device in the first operating state after the end of the disturbance on the operating voltage of the sensor, is preferably greater than a transient recovery time of the sensor, the transient recovery time of the sensor being a time duration required by the sensor until, after the end of the disturbance on the operating voltage of the sensor, the sensor signal attains a stable and reliable value.

In one preferred exemplary embodiment, the monitoring device has a first resetting device, which is designed to monitor an operating voltage of an analogue circuit part of the sensor, and to reset the analogue circuit part of the sensor if the operating voltage of the analogue circuit part of the sensor meets a first disturbance condition, the monitoring device furthermore being designed to ensure that the storage device is not in the second operating state while the first resetting device resets the analogue circuit part of the sensor. In this respect, it should be noted that the analogue circuit part of the sensor is for example an amplifier or an analogue-to-digital converter. Furthermore, it must be emphasized that the first disturbance condition is met if reliable operation of the analogue circuit part of the sensor is not ensured on account of a disturbance on an operating voltage of the analogue circuit part of the sensor. Specifically, it has proved to be advantageous to combine resetting devices for the sensor with the monitoring device of the holding device. This is because a resetting of the sensor is required whenever the sensor no longer supplies a reliable sensor signal on account of a disturbance. In this case, the storage device is intended to be in the first state, in which an updating of the signal value stored in the storage device is prevented. Consequently, separate implementation of a resetting circuit for the sensor and of a monitoring circuit for the holding device is not necessary. Finally, it has also been recognized that forwarding of a sensor signal by the storage device is not desirable if the sensor is currently being reset, even if the disturbance responsible for the resetting has already ended. Consequently, the realization described affords the possibility of designing in an efficient manner the entire circuit technology required for the monitoring and initialization of the sensor. The resetting device simultaneously fulfils the task of monitoring reliable operation of the sensor, resetting the sensor and influencing the forwarding of sensor signals by the storage circuit. A reaction to the presence of a disturbance on the operating voltage of the sensor is simultaneously a resetting of the sensor and a prevention of the forwarding of sensor signals by the storage device.

Since the digital circuit part of the sensor is also susceptible to disturbances on the operating voltage of the digital circuit part, it is preferred for the monitoring device to have a second resetting device, which is designed to monitor the operating voltage of the digital circuit part of the sensor, and to reset the digital circuit part if the operating voltage of the digital circuit part meets the second disturbance condition. The monitoring device is furthermore designed to ensure that the storage device is not in the second operating state while the second resetting device resets the digital circuit part of the sensor. The operating voltage of the digital circuit part meets the second disturbance condition if reliable operation of the digital circuit part is not ensured on account of a disturbance on the operating voltage of the digital circuit part.

It should furthermore be pointed out that the digital circuit part may be for example a data conditioning device or data conditioning circuit which is designed to condition data from a sensor element and to supply the sensor signal arising during the conditioning to the holding device.

In accordance with the disturbance properties of the analogue circuit part and of the digital circuit part, it is preferred for the first disturbance condition to be met if the operating voltage of the analogue circuit part has at least one small deviation from a desired value over a long time period, and the second disturbance condition to be met if the operating voltage of the digital circuit part has a large deviation from a desired value at least over a short time period.

In other words, a deviation—accepted as permissible by the first resetting device—of the operating voltage of the analogue circuit part from a desired value for the operating voltage of the analogue circuit part is smaller than a deviation—accepted as permissible by the second resetting device—of the operating voltage of the digital circuit part from the desired value for the operating voltage of the digital circuit part. However, the first resetting device is designed to reset the analogue circuit part only in response to a longer deviation of the operating voltage of the analogue circuit part from the desired value, while the second resetting circuit is designed to reset the digital circuit part even in response to significantly shorter deviations of the supply voltage of the digital circuit part. By means of a resetting circuit designed in this way, it is in turn possible to comprehend the disturbance behaviour of the digital circuit part and of the analogue circuit part in a simple manner since the digital circuit part already reacts to very short disturbances of the supply voltage of the digital circuit part. The analogue circuit part, by contrast, is essentially sensitive to slow fluctuations of the supply voltage of the analogue circuit part even if the fluctuations of the supply voltage of the analogue circuit part have only a small amplitude.

It is furthermore preferred to design the monitoring device to hold the storage device in the first state for a third predetermined time duration after an end of the resetting of the analogue circuit part and the resetting of the digital circuit part, so that an updating of the signal value stored in the storage device is prevented. This is because after the resetting of the analogue circuit part of the sensor and the digital circuit part of the sensor, a specific time is required until the sensor has reinitialized or settled. During this time period, which is also referred to as start-up of the sensor, the sensor signal is not reliable and must consequently be regarded as invalid. The delay between the end of the resetting of the circuit parts and a transfer of the storage device into the second operating state, in which it is possible to update the signal value based on the sensor signal, thus prevents invalid signal values from being present in the storage device and thus at the output of the holding device.

In a further preferred exemplary embodiment, the monitoring device furthermore comprises a third resetting device, which is designed to identify whether a lengthy disturbance or interruption of the operating voltage of the holding device or of the sensor with a duration longer than a fourth predetermined time duration was present. The third resetting device is designed to set the signal value of the storage device to the predetermined precharge value if the lengthy disturbance of the operating voltage of the holding device or of the sensor was present. This is because it is assumed that a value stored in the storage device is no longer valid if the operating voltage of the holding device or of the sensor was interrupted for a period of time which is longer than the fourth predetermined time duration. This is because after a lengthy disturbance of the operating voltage, the signal value stored in the storage device may either deviate greatly from the actual sensor signal or be completely lost on account of a limited retention time of the storage device. In this case, it is advantageous to set the storage device to a precharge value which, by way of example, is suitable for indicating to a further processing device connected to the signal output of the holding device that no valid value corresponding to an actual sensor signal is present at the signal output of the holding device.

The third reset circuit may preferably comprise an R-C element and a Schmitt trigger coupled to the R-C element, the output signal of the Schmitt trigger forming the precharge signal. The R-C element is charged during regular operation by the operating voltage of the holding device or of the sensor. In the absence of the operating voltage of the holding device or of the sensor, the R-C element is discharged with a predetermined time constant. From a knowledge of the instantaneous voltage which is present after the end of an operating voltage interruption of the holding device or of the sensor at the R-C element, it is thus possible to determine how long the operating voltage interruption was present. The circuitry outlay for such a third resetting device is low.

It is furthermore preferred if the storage device is designed to store the signal value in a passive basic state, and to enable updating of the signal value based on the sensor signal in an active state. In this case, a passive basic state is a state which is present in the absence of a supply voltage of the storage device, of the holding device or of the sensor. The passive basic state is also assumed whenever it is not ensured that the signal present at the signal input of the holding device is valid. In other words, the basic state is a quiescent state that is assumed whenever a valid sensor signal is not indicated by a controlled activation of one or more signals. It is thus ensured that the storage device is not inadvertently updated with the sensor signal, but rather only precisely when it is in an active state (brought about actively). In this case, it is advantageous, of course, if it is ensured that an active state cannot occur inadvertently. This can be achieved by taking care to ensure that after the supply voltage of the storage device has been switched on, firstly the passive basic state, in which an updating of the signal value is prevented, is automatically assumed.

In other words, it is preferred for the storage device to be designed to assume the passive basic state if the supply voltage of the storage device falls below a predetermined minimum voltage.

It is furthermore preferred that the storage device is an analogue holding element comprising a capacitor that is decoupled from the signal input in the passive basic state. An embodiment of the storage device as an analogue holding element can be realized in a particularly simple manner and is particularly advantageous if the sensor supplies an analogue sensor signal at the signal input of the holding device. Moreover, a capacitor is able to store its charge even without the presence of a supply voltage of the storage device and, consequently, to retain the signal value virtually unchanged independently of the supply voltage over a certain period of time. In addition, a capacitor can be realized in a comparatively simple manner. However, it is also possible to use other holding elements corresponding to the prior art, often also called "sample and hold" elements, which have the property of holding a stored value without any errors or virtually without any errors over a certain period of time without a supply voltage.

In other cases in which the sensor signal supplied by the sensor to the signal input of the holding device is a digital signal, it is preferred that the storage device is a digital holding element that is decoupled from the signal input in the passive basic state. A digital holding element is suitable for being able to store a signal value of a digital sensor signal. A digital holding device can be realized with a low outlay, too, it once again being possible to utilize the charge storage in capacitances which occur in the digital holding device.

Accordingly, it can generally be established that the storage device preferably comprises at least one electrical charge store that is decoupled from the signal input in the passive basic state by means of at least one opened switching device and can be coupled to the signal input in the active second state.

It is further preferred that the storage device is designed to update the signal value based on the sensor signal in the second state if the sensor indicates a presence of a new signal value of the sensor signal by means of an acceptance signal. In other words, if the storage device is in the second state, the sensor signal is not accepted continuously, but rather only in response to an acceptance signal supplied by the sensor. This is expedient since a multiplicity of sensors supply a time-discrete sensor signal which can only be accepted at specific acceptance instants. Consequently, the use of an acceptance signal makes it possible to coordinate the storage device with the sensor.

Finally, it is preferred that the monitoring device is designed, given the presence of an invalid sensor signal at the signal input, to bring the storage device into the first state so rapidly that the invalid sensor signal is not accepted into the storage device. By way of example, it is advantageous that the monitoring device puts the storage device into the first state before the storage device receives an active acceptance signal from the sensor. The monitoring device should therefore preferably operate so rapidly that it is possible to identify an invalid sensor signal within a time duration that is shorter than the time duration between two successive acceptance signals. This ensures that the storage device is only updated with a valid sensor signal.

Furthermore, it is preferred that the holding device is designed to output the signal value stored in the storage device to a signal conditioning device of the sensor in order to enable an accelerated initialization of the sensor after a disturbance. In this case, the signal conditioning device in the sensor is preferably designed to receive the signal value from the holding device and to use it for an initialization of the sensor. By way of example, the signal value supplied by the holding device can be used during a reinitialization (reset) of the signal conditioning device (or data conditioning).

The signal value supplied by the holding device may be fed for example to one or more registers of a digital filter as initial value in order to accelerate the transient recovery behaviour of the digital filter. In a similar manner, the signal value from the holding device may be fed for example to a scaling device of the sensor, whereby the scaling device can determine a suitable scaling within a short time. Feeding the signal value from the holding device to the signal conditioning device of the sensor is particularly advantageous after a short disturbance of the operating voltage of the sensor which necessitates a reinitialization of the sensor. The use of the signal value which is stored in the holding device even during a voltage dip means that the signal conditioning device of the sensor no longer has to be initialized with arbitrary initial values, rather it is possible to use values which are based on the last valid signal value of the sensor signal.

If it is assumed that the electrical signal supplied by the sensor element has changed only slightly during the disturbance of the supply voltage of the sensor, then the signal conditioning device can be initialized, using the signal value stored in the holding device, with initial values which are close to actual values that would be present without the presence of a disturbance on the supply voltage. The transient recovery time of the sensor or of the signal conditioning device of the sensor is thus drastically accelerated compared with a transient recovery based on initial values that are arbitrarily stipulated once.

The signal value supplied by the holding device to the signal conditioning device of the sensor may be present in analogue or digital form, depending on whether the signal conditioning device is an analogue or a digital signal conditioning device.

The sequences described above may also be interpreted as a method for forwarding a sensor signal. The forwarding of the sensor signal is effected using a storage device designed to store a signal value for a time period which is longer than a predetermined first time duration, independently of the supply voltage of the storage device. The method may comprise receiving a sensor signal from a sensor, checking whether the sensor signal is valid, updating the signal value stored in the storage device based on the sensor signal only if it is ensured that the received sensor signal is valid, and outputting the signal value stored in the storage device. The method may thus ensure that the sensor signal is accepted into the storage device only when the sensor signal is valid. Therefore, a valid signal value is always present in a preferred manner at an output of the storage device. If the sensor supplies an invalid sensor signal, then the storage device holds the last valid signal value and accepts signal values from the sensor signal again only when it is ensured that the sensor signal is valid. Advantages of the method are identical to the advantages of the apparatus as already described above and are therefore not explained again here. Rather, reference is made to the above illustration.

Furthermore, it may be preferred to realize the method in the form of a computer program which can be executed in a digital signal processing device. The steps of the computer program and the corresponding advantages again correspond to those of the method and of the apparatus.

FIG. 1 shows a block diagram of a sensor system with a holding device in accordance with a first exemplary embodiment. The sensor system shown in FIG. 1 is designated in its entirety by 100. The sensor system 100 comprises a sensor 110 and also a holding device 112. The holding device has a signal input 120, which receives a sensor signal 122 supplied by the sensor 110. The holding device 112 furthermore has a signal output 124, which may be coupled for example to a further superordinate signal processing device. The holding device 112 furthermore comprises a storage device 130 and also a monitoring device 132. The storage device 130 is coupled to the signal input 120 and to the signal output 124. The storage device 130 is furthermore coupled to the monitoring device 132, the monitoring device 132 being able to define the state of the storage device 130. The monitoring device 132 thus feeds a control signal 134 to the storage device 130. Furthermore, the monitoring device 132 is designed to receive monitoring information items 136 from the sensor 110, which enable the monitoring device 132 to make a statement about whether the sensor signal 120 supplied by the sensor 110 is valid.

On the basis of the structural description, the functioning of the sensor system 100 shown is explained in more detail below. The storage device 130 is designed to store a signal value in the first state, and to update the signal value based on the sensor signal 122 in a second state. Furthermore, the storage device 130 is designed to provide the stored signal value at the signal output 124 of the holding device 112. The storage device 130 is furthermore designed in such a way that it can store the signal value for a predetermined period of time independently of a supply voltage of the storage device. In this case, a supply voltage terminal of the storage device 130 is designated by 140, while a reference potential terminal of the storage device 130 is designated by 142.

The monitoring device 132 is designed to determine whether the sensor signal 122 supplied by the sensor 110 is valid. For this purpose, the monitoring device 132 receives a monitoring information item 136 from the sensor 110. The monitoring device 132 is configured to ensure that the storage device is in the second state, in which an updating of the stored signal value is possible, only when the monitoring device 132 identifies that the sensor signal 122 at the signal input 120 is valid.

It should be noted in this case that the control signal 134 is preferably in a passive basic state as long as the monitoring device has not reliably ascertained that the sensor signal 122 is valid. In this case, the storage device 130 stores the present signal value and does not update the latter. Only if the monitoring device indicates by means of an active control signal 134 to the storage device 130 that the sensor signal 122 present at the signal input 120 is valid does the storage device 130 permit the updating of the signal value stored in it. Control signals, such as the validity signal 134, may, besides the output signal 124, likewise be forwarded as required to connected or superordinate devices in order to communicate state information regarding the up to date nature of the output signal 124 or the input signal 122 or the states of monitored components of the sensor.

The signal value stored in the storage device 130 can be output at any time at the signal output 124 as long as it is ensured that the supply voltage is present at the supply voltage terminal 140 of the storage device 130.

If, by way of example, a supply voltage 150 of the sensor fails from current operation of the sensor 110, then the sensor no longer supplies a reliable sensor signal 122. In this case, the monitoring device 132 identifies on account of the monitoring information items 136 that the sensor signal 122 supplied by the sensor 110 is invalid. The monitoring device 132 then immediately switches the storage device 130 into the first operating state by means of the control signal 134, in which first operating state the storage device 130 retains the stored signal value but does not permit or prevent an updating of the stored signal value based on the sensor signal 122. Consequently, the signal value stored in the storage device 130 is output in constant fashion at the signal output 124 while the storage device 130 is in the first operating state. In this case, it should be noted, moreover, that no signal value can be output at the signal output 124 as long as the supply voltage at the supply voltage terminal 140 of the storage device 130 is disturbed. However, as soon as the supply voltage is present again at the supply voltage terminal 140 of the storage device 130, the latter immediately again outputs the signal value that was stored last at the signal output 124.

The sensor 110, by contrast, requires a specific time in order to supply a correct sensor signal 122 again after the supply voltage 150 of the sensor 110 has been reestablished. By way of example, the sensor 110 has to be reinitialized after a disturbance of the supply voltage 150 of the sensor 110. This typically entails a start-up of the sensor signal 122 or a transient recovery process of the sensor signal 122. However, the monitoring device 132 identifies on account of the monitoring information 136 whether the sensor signal 122 is valid. By way of example, the monitoring device 132 can detect a disturbance of the supply voltage 150 of the sensor 110 and furthermore take account of the fact that the sensor 110 requires a specific time after the end of the disturbance of the supply voltage 150 in order to supply a valid sensor signal 122 again. During the aforementioned period of time during which the sensor 110 carries out a reinitialization or a start-up after a disturbance of its supply voltage 150, the monitoring device 132 ensures that the storage device 130 is in the first state and therefore does not update the stored signal value with the sensor signal 122. Only if the monitoring device 132 reliably ascertains that a reliable and hence valid sensor signal 122 is present at the signal input 120 of the holding device 112 does the monitoring device 132 permit, by means of the control signal 134, the storage device 130 to revert to the second operating state, in which the signal values stored in the storage device 130 are updated with the sensor signal 122 of the sensor 110 that is present at the signal input 120.

Consequently, a constant signal value which is based on the last valid sensor signal or represents the last valid sensor signal is output at the signal output 124 during a disturbance of the sensor 110, that is to say for example during a disturbance of the supply voltage 150 of the sensor 110. It is only if the monitoring device 132 ascertains that the sensor signal 122 is valid again after a disturbance of the sensor 110 that the signal value stored in the storage device 130 is updated again with the sensor signal 122 and the sensor signal 122 is thus forwarded to the signal output 124.

During a disturbance of the sensor, that is to say during the time during which the sensor signal 122 is invalid, a signal value which is based on the last valid sensor signal is thus output at the signal output. Thus holds true even when the disturbance of the sensor was caused by a dip in the supply voltage 150 of the sensor, and furthermore even when a supply voltage at the supply voltage terminal 140 of the storage device 130 had a disturbance. This is because the storage device 130 is designed to retain or store the stored signal value for a specific time also independently of the supply voltage 150 of the storage device. Consequently, the holding device may ensure that even after a short disturbance of the supply voltage of the sensor or of the storage device, a signal value corresponding to the last valid signal value of the sensor signal 122 is present at the signal output 124. Consequently, a disturbance of the supply voltage 150 of the sensor is not visible at the signal output 124 of the holding device. If the measurement signal changes only minimally during the disturbance of the sensor 110, then a correct signal value is always present at the signal output 124 of the holding device, apart from the points in time at which the supply voltage at the supply voltage terminal 140 of the storage device 130 also has a disturbance. A transient recovery process or start-up process or a reinitialization of the sensor 110 and the associated undesirable signal profiles of the sensor signal 122 remain hidden at the signal output 124 of the holding device.

It should be noted in this case that the sensor 110 may be any desired sensor. The sensor 110 may comprise a sensor element, but the sensor element may also equally well have an external sensor element. The sensor preferably comprises a circuit arrangement for data conditioning, which may be embodied as an analogue or digital circuit. The sensor may furthermore comprise an interface in order to provide the sensor signal 122. The sensor signal 122 may in turn be present as an analogue or digitized signal.

Accordingly, the storage device may also be an analogue storage device or a digital storage device. The signal present at the signal output 124 may likewise be an analogue or a digital signal.

Finally, the monitoring device 132 can monitor the validity of the sensor signal 122 in any desired manner. One possible form of realization is the monitoring of the at least one supply voltage 150 of the sensor 110. However, it is also possible for the monitoring device 132, for example from the properties of the sensor signal 122, itself to draw a conclusion as to whether the sensor signal 122 is valid. By way of example, a very fast temporal alteration which is faster than a temporal delay occurring in proper operation may indicate that the sensor signal 122 is invalid. Furthermore, oscillations on the sensor signal 122 may also be an indication that the sensor signal 122 is invalid because the sensor 110 is currently subject to a disturbance or a transient recovery process. In all these cases, the monitoring device 132 can transfer the storage device 130 into the first state, in which an updating of the signal value stored in the storage device 130 is prevented.

As shown on the basis of the sensor system 100, a fundamental idea may be to identify error states, in which by definition the sensor signal 122 is invalid, independently of a data conditioning in the sensor (also referred to as sensor processing) or within the data conditioning in the sensor (also referred to as sensor processing) and to interrupt a data forwarding of measurement data (that is to say of the sensor signal 122) to an interface (which may be connected for example to the signal output 124 of the holding device 112) in the error case. It can thereby be ensured that the last valid data of the sensor signal, that is to say the data of the sensor signal before the occurrence of the error state or error case (also referred to as error for short), are held. The data forwarding is enabled again only when the error state or error case has been left and the system or sensor system is operating stably again, that is to say when the sensor signal 122 is by definition valid again.

The procedure described is advantageous for example in measuring arrangements in which the measurement quantity is slow in comparison with a start behaviour (of the sensor) to be suppressed. In other words, if the measurement quantity changes only slightly during a start-up or during a reinitialization of the sensor 110 (or of a data conditioning arrangement contained in the sensor), then a signal that differs only slightly from a correct signal such as would occur during undisturbed operation of the sensor 110 is present at the signal output 124 of the holding device 112 at any point in time. This holds true even when the sensor 110 has to start up anew (or has to carry out a reinitialization) on account of a disturbance, for example on account of a disturbance of its supply voltage 150.

With the use of a holding device 112, furthermore, only the element for holding a last (valid) datum (or signal value) may have to be implemented in a manner immune to interference. All investigations and observations during the case of disturbance (that is to say while the sensor 110 and thus the sensor signal 122 are disturbed) can be concentrated on the element for holding the last (valid) datum. In the sensor system 100, the element for holding the last valid datum is for example a part of the storage device 130 or the entire storage device 130.

A monitoring of the sensor system 100 shown may likewise be carried out completely independently of the sensor 110 and take account of arbitrary quantities of the sensor system 100.

Figure 2:
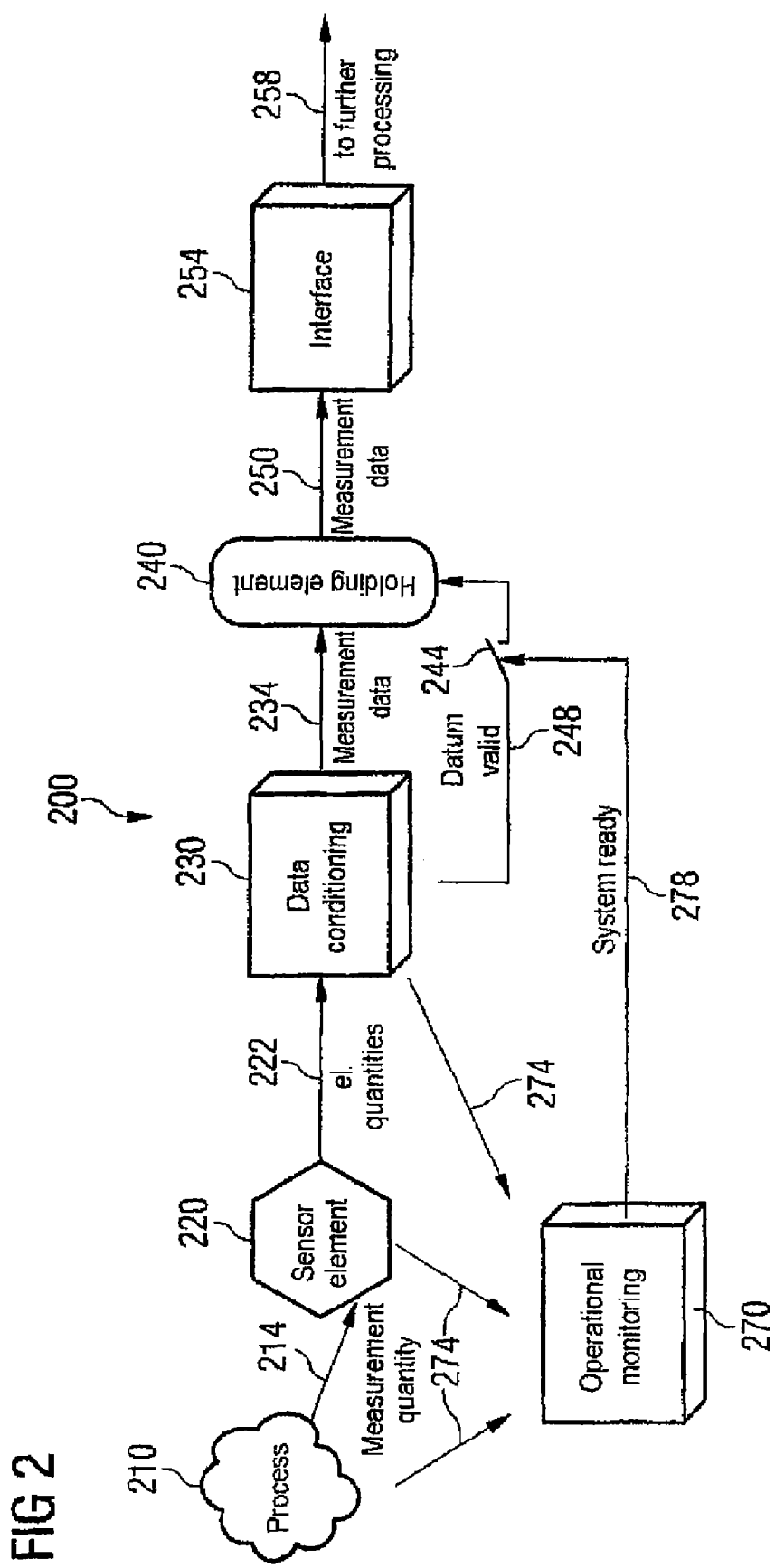
FIG. 2 shows a block diagram of a sensor system with a holding device in accordance with a second exemplary embodiment.

FIG. 2 shows a block diagram of a sensor system with a holding device in accordance with a second exemplary embodiment. The sensor system shown in FIG. 2 is designated in its entirety by 200. In this case, the sensor system 200 is designed to monitor a process 210. A sensor element 220 is designed to detect a measurement quantity 214 which occurs in the process 210. The sensor element 220 supplies, on the basis of the measurement quantity 214, one electrical quantity or a plurality of electrical quantities, which are designated by 222, to a data conditioning 230. The data conditioning 230 supplies conditioned measurement data 234 to a holding element 240. Furthermore, the data conditioning 230 supplies an acceptance signal 248 to the holding element 240 via a switching device 244. The holding element 240 in turn supplies held measurement data 250 to an interface 254. The interface 254 forwards the held measurement data 250 to a further processing device (not shown here) for further processing, the forwarding being indicated here by 258. The switching device 244, which can forward or interrupt the acceptance signal 248 supplied to the holding element 240 by the data conditioning 230, is driven by an operational monitoring 270. The operational monitoring 270 monitors the process 210, the sensor element 220 and the data conditioning 230, which is indicated by the arrows 274. The operational monitoring 270 thus supplies a control signal 278 to the switching device 244.

It is pointed out that the conditioned measurement data 234 are also referred to as sensor signal hereinafter. The holding element 240 furthermore constitutes a storage device. The operational monitoring 270 may also be referred to as monitoring device. It is furthermore pointed out that the holding element (storage device) 240 together with the switching device 244 and the operational monitoring (monitoring device) 270 forms a holding device.

It should furthermore be pointed out that a combination comprising the sensor element 220 and the data conditioning 230 forms a sensor.

Figure 10:
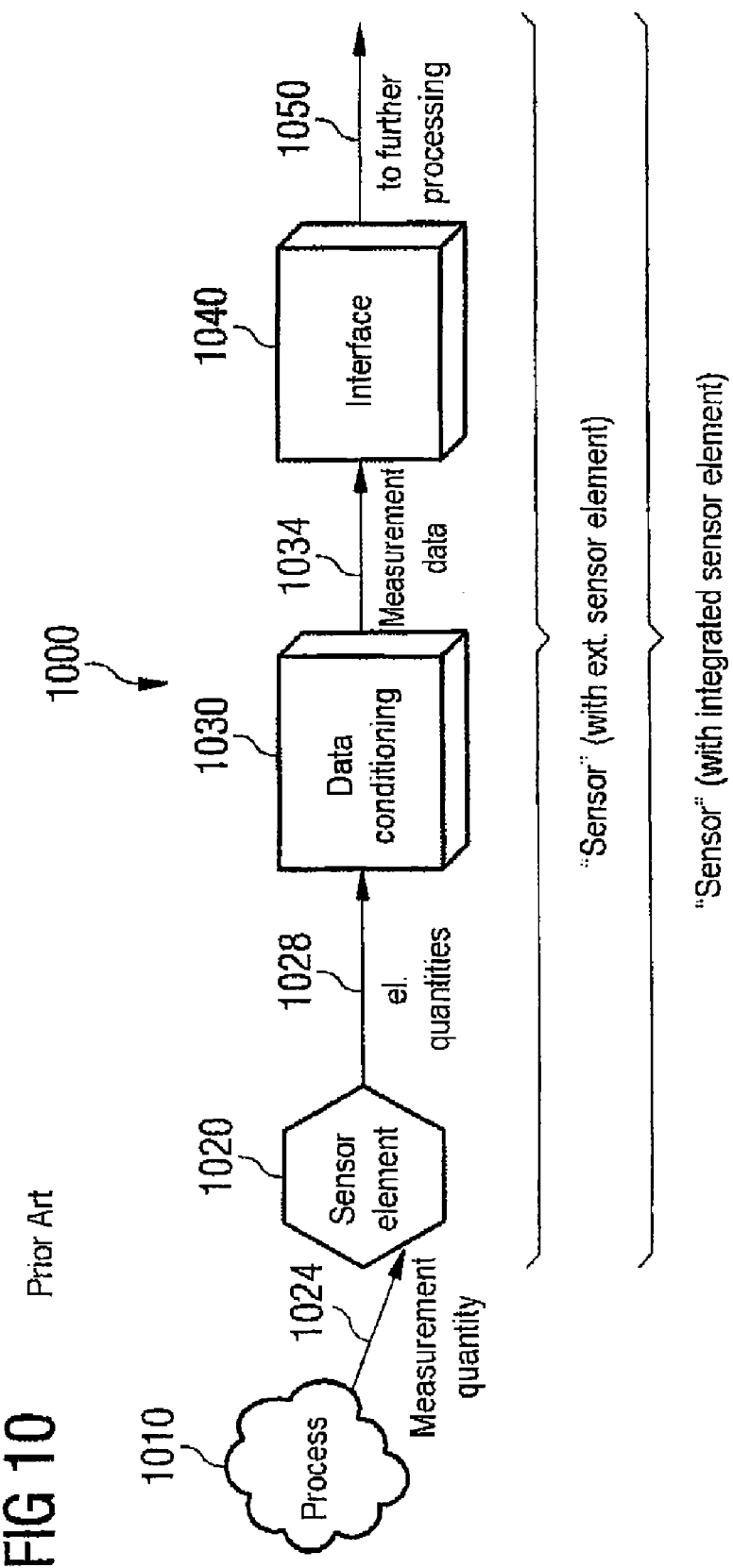
FIG. 10 shows a schematic diagram of a data acquisition system in accordance with the prior art.

The sensor system 200 shown in FIG. 2 realizes a central concept. The sensor system 200 is supplemented by the holding element (or storage device) 240 by comparison with the data acquisition system 1000 in accordance with the prior art as shown in FIG. 10. The storage device 240 is driven by the data conditioning 230 (data conditioning block), the data conditioning 230 supplying the acceptance signal 248 to the storage device 240 via the switching device 244. The storage device 240 accepts a sensor signal 234 (conditioned measurement data) supplied by the data conditioning 230 if the acceptance signal 248 indicates that the sensor signal 234 can be accepted. In other words, the acceptance signal 248 can be interpreted as "datum valid signal", although the acceptance signal 248 merely indicates the presence of a new sensor signal but does not permit a statement about the reliability about the sensor signal. Consequently, the storage device 240 accepts new data, for example a new signal value, defined according to the data conditioning and holds the corresponding data or the corresponding signal value. The monitoring device 270 (operational monitoring) can prevent this process, that is to say the acceptance of data or signal values from the data conditioning 230 by the holding element 240. For this purpose, the monitoring device 270 can use the control signal 278 fed to the switching device 244. The control signal 278 can thus be interpreted as "system ready signal".

In other words, the monitoring device 270 is designed to drive the control signal 278 in such a way that an acceptance of data by the storage device is possible only when the monitoring device 270 has identified that the sensor signal 234 is valid. The switching device 244 is thus open in a passive basic state, whereby an acceptance of data by the storage device 240 is interrupted. The switching device 244 is closed only in an active state, so that an acceptance of data or of the sensor signal 234 into the storage device 240 is possible. The acceptance of the conditioned measurement data, that is to say of the sensor signal 234, into the storage device 240 is effected if the data conditioning 230 additionally activates the acceptance signal 248.

The monitoring device 270 may be designed to monitor the process 210 and/or the sensor element 220 and/or the data conditioning 230. It is preferred, for example, for the monitoring device 270 to monitor at least a supply voltage of the data conditioning 230 and/or of the sensor element 220. Furthermore, the monitoring device 270 is preferably configured in such a way that it prevents the acceptance of the sensor signal 234 into the storage device 240 (for example by opening the switching device 244) as soon as the monitoring device 270 ascertains a disturbance on a supply voltage of the data conditioning 230 and/or of the sensor element 220.

It should be emphasized here that the storage device 240 preferably holds a signal value stored in the storage device 240 (or a measurement quantity stored in the storage device 240) in a (passive) basic state. Only as a result of an unambiguous activation of a signal does the storage device (holding element) 240 accept the new signal value or a new datum (based on the sensor signal 234). Furthermore, the storage device 240 may comprise an apparatus for precharging the signal value (or datum) stored in the storage device 240. This apparatus for precharging the signal value may be activated for example during an initial start, also referred to as "power-on reset", and be designed to set the storage device to a predefined value.

Furthermore, the monitoring device 270 (operational monitoring) is designed to immediately lock a data updating line in the error case (that is to say if the sensor signal 234 is invalid). In the example 200, the data updating line is for example that line which carries the acceptance signal 248 from the data conditioning 230 to the storage device 240. The data updating line is correspondingly blocked by opening the switching device 244. Consequently, in the passive state a block is active, that is to say that the data updating line is blocked and the acceptance signal 248 is not forwarded to the storage device 240. The switching device 244 is open. Only in the event of error-free operation does the block become inactive, that is to say that only in the event of error-free operation does the monitoring device 270 enable the acceptance signal 248 to be forwarded from the data conditioning 230 to the storage device 240. In other words, it is only if the monitoring device 270 identifies error-free operation that the switching device 244 is closed. An enabling of the data updating line may preferably be effected in a delayed manner after the end of the error case, in order that a start behaviour of the sensor element 220 or of the data conditioning 230 is not forwarded to the interface 254. In other words the enabling of the data updating line is effected in a delayed manner in order to reliably suppress a start behaviour. In other words, the acceptance signal 248 is switched through to the storage device 240 again only with a certain delay after the end of an error case; the switching device 244 is closed again only with a certain delay after the end of an error case.

Furthermore, the data updating line may also be enabled by means of a quantity from the data conditioning 230. In other words, the data conditioning 230 itself can ascertain whether the sensor signal 234 (conditioned measurement data) supplied by it is valid. If the data conditioning 230 identifies that the sensor signal 234 is valid, the data conditioning can itself cause the switching device 244 to be closed, whereby the storage device 240, in response to an acceptance signal 248, updates the signal value stored in the storage device on the basis of the sensor signal 234.

In an error case, by contrast, the block is immediately activated again, however, whereby an updating of the storage device 240 (holding element) is reliably prevented.

The sensor system 200 can be varied in a wide range. Thus, it is possible, by way of example, for the sensor signal 234 (conditioned measurement data) to be an analogue and time-continuous signal. In this case, the storage device 240 may be an analogue storage device. In this case, however, the data conditioning 230 possibly does not generate an acceptance signal 248. This is because an acceptance signal is dispensable, for example, if the sensor signal 234 is time-continuous. Nevertheless, in this case, too, a data updating in the storage device 240 is prevented by means of a suitable device (for example a switching device) as long as the monitoring device 270 has not ascertained that the sensor signal 234 supplied by the data conditioning 230 is valid. In other words, the time-discrete updating of signal values stored in the storage device 240 as shown may be replaced by a time-continuous data updating which, however, can be interrupted by the monitoring device 240.

Furthermore, the interface 250 may be obviated. It is merely preferably necessary to ensure that a signal value stored in the storage device 240 can be reliably forwarded to a further processing.

The monitoring device 270 (operational monitoring) may be designed to monitor only the data conditioning 230, only the sensor element 220 or only the process 210. Furthermore, the monitoring device 270 may also monitor an arbitrary combination of the data conditioning 230, the sensor element 220 and the process 210. Furthermore, other quantities may influence the monitoring device 270. Thus, it is also possible for the monitoring device 270 to monitor the function of the storage device 240 itself.

The monitoring device 270 may furthermore be designed to precharge the storage device 240 to a predefined precharge value if the monitoring device 270 identifies a lengthy failure of the power supply, the duration of which is longer than a predefined time duration. Furthermore, the monitoring device 270 may also precharge the storage device 240 to a second predefined precharge value if it identifies a serious and not just temporary error.

Figure 3A:
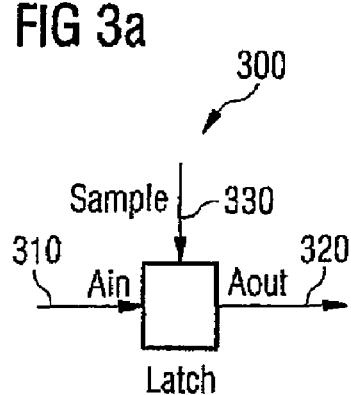
FIG. 3a shows a schematic illustration of an analogue storage device for use in a holding device.
Figure 3B:
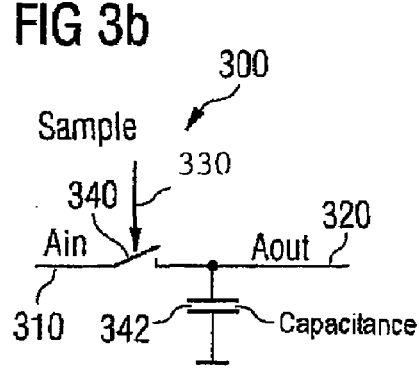
FIG. 3b shows a circuit diagram of an exemplary embodiment of an analogue holding device for use in a holding device.

FIGS. 3a and 3b show a schematic illustration of a storage device for use in a holding device. The analogue storage device shown in FIG. 3a is designated in its entirety by 300. The analogue storage device 300 may also be referred to as "latch". FIG. 3b shows a circuit diagram of an exemplary embodiment of an analogue holding element 300. The analogue holding element 300 has an analogue input 310 and also an analogue output 320. Furthermore, the analogue storage device 300 has a sample input ("Sample") designated by 330. Moreover, it should be pointed out here that identical reference symbols in FIGS. 3a and 3b designate identical devices.

FIG. 3b describes how the analogue storage device 300 (also referred to as analogue holding element) can be realized by an analogue "sample-and-hold" circuit. Such a "sample-and-hold" circuit comprises a switch 340, via which a capacitance 342 can be connected to the analogue input 310. The switch 340 thus serves for charging the capacitance 342 to a voltage present at the analogue input 310. The capacitance 342 furthermore serves for charge retention or for charge storage while the switch 340 is open. It should furthermore be noted that the capacitance 342 is connected to the analogue output 320 of the "sample-and-hold" circuit, so that the voltage present across the capacitance 342 can be tapped off at the analogue outlet 320.

The analogue storage device 300, which may be embodied for example, as shown in FIG. 3b, as a "sample-and-hold" circuit, makes it possible in this case for the charge to be held in the capacitance 342 independently of a supply voltage and other external influences. Consequently, the analogue storage device shown can meet the requirement.

Figure 4A:
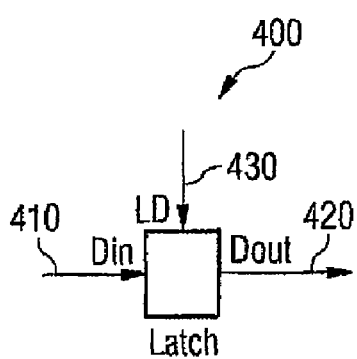
FIG. 4a shows a schematic illustration of a digital storage device for use in a holding device.
Figure 4B:
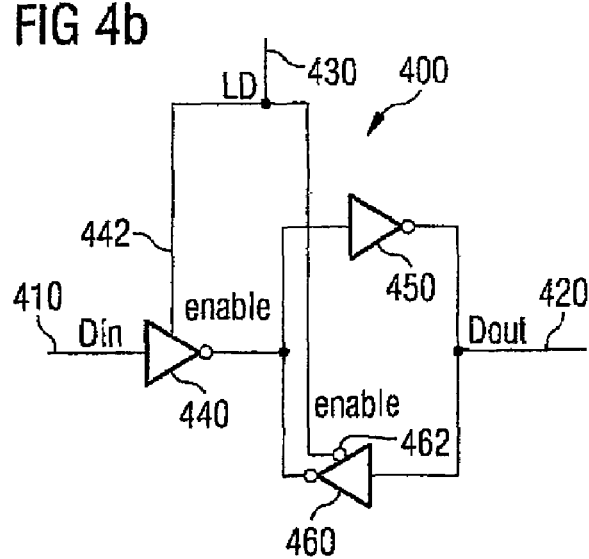
FIG. 4b shows a circuit diagram of an exemplary embodiment of a digital storage device for use in a holding device.

FIG. 4a shows a schematic illustration of a digital storage device for use in a holding device. The digital storage device shown in FIG. 4a is designated in its entirety by 400. FIG. 4b shows a circuit diagram of an exemplary embodiment of a digital storage device 400 for use in a holding device. The circuit arrangement of FIG. 4b represents a realization of the digital storage device illustrated schematically in FIG. 4a. Accordingly, identical reference symbols in FIGS. 4a and 4b designate identical devices.

The digital storage device 400 comprises a digital input 410, a digital output 420 and also a charging input 430. The digital storage device 400 may also be interpreted as a digital holding element or "latch" and, in a preferred realization, comprises for example a feedback inverter structure having a charging input, said structure also being referred to as a "latch".

The digital storage device 400 comprises a first inverter 440 having an enable input (enable) 442, a second inverter 450 and also a third inverter 460 having an inverted enable input (enable) 462. An input of the first inverter 440 is coupled to the digital input 410. An output of the first inverter 440 is connected to the input of the second inverter 450 and also to an output of the third inverter 460. An output of the second inverter 450 is connected to an input of the third inverter 460 and is furthermore coupled to the digital output 420. The enable input 442 of the first inverter and the inverted enable input 462 of the third inverter 460 are both connected to the charging input 430. Consequently, a state on a connecting line that connects the output of the first inverter 440, the output of the third inverter 460 and the input of the second inverter 450 is controlled by the charging input 430. The digital output 420 always receives a signal (from the second inverter 450) independently of a level present at the charging input.

The first inverter 440, the second inverter 450 and the third inverter 460 thus form a digital holding element, that is to say a "latch", in the case of the circuitry described. In this case, by way of example, even when a supply voltage is absent, a charge can be held at gates of inverter transistors if a CMOS technology is used to realize the inverters 440, 450, 460. Therefore, if the supply voltage of the inverters 440, 450, 460 is applied again after a failure of the supply voltage, a digital datum stored in the digital storage device 440 prior to the failure of the supply voltage is still available at the digital output 420 of the digital storage device 400.

It is furthermore pointed out that both in the case of the analogue storage device 300 and in the case of the digital storage device 400, an important commonality consists in the fact that a (stored) measurement quantity is held in a passive basic state, and that a new measurement quantity (datum) is accepted as a result of an unambiguous activation of a signal. Consequently, an active signal is necessary in order to enable an alteration of the measurement quantity (datum) stored in the analogue storage device 300 or the digital storage device 400. Furthermore, the storage devices 300, 400 may be provided with an apparatus for precharging the value which, for example in the event of an initial start (after a lengthy interruption of the power supply), enables the value of the storage device 300, 400 to be precharged. Such an initial start after a lengthy interruption of the voltage supply is also referred to as a "power-on reset".

Figure 5:
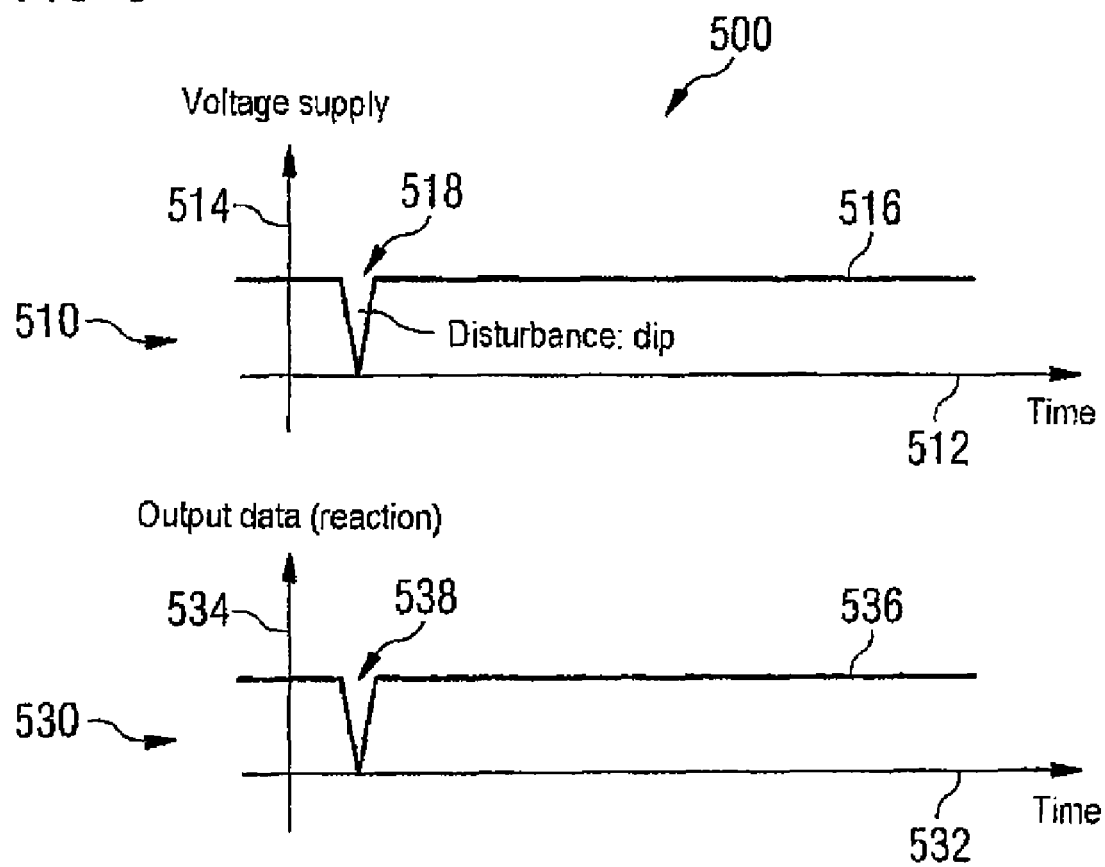
FIG. 5 shows an exemplary graphical illustration of output data present at a signal output of a holding circuit as a response to a disturbance of the voltage supply.
Figure 11:
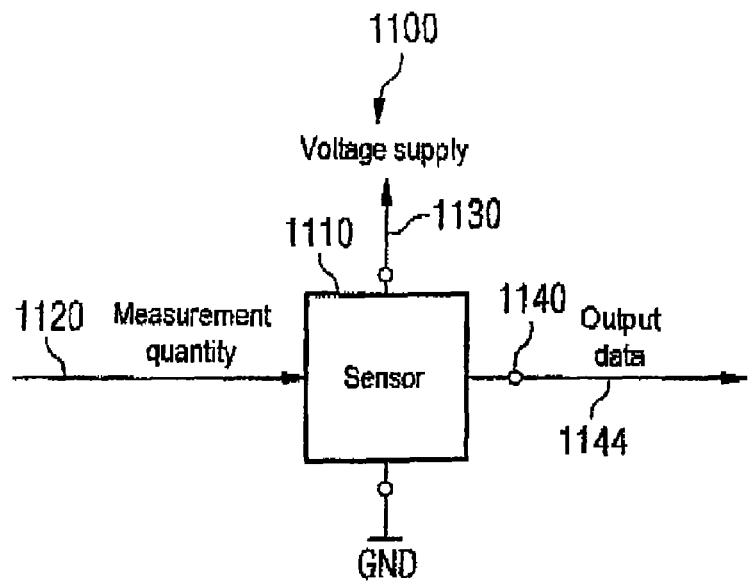
FIG. 11 shows a schematic illustration of a simple sensor system with three terminals.

FIG. 5 shows an exemplary graphical illustration of the output data present at a signal output of a holding circuit as a response to a disturbance of the voltage supply. The graphical illustration shown in FIG. 5 is designated in its entirety by 500. It should be mentioned here, moreover, that the graphical illustration 500 was recorded for a simple sensor system having three terminals such as has been described with reference to FIG. 11, for example, the simple sensor system having been supplemented, of course, by a holding device according to one embodiment.

A first graphical illustration 510 shows a temporal profile of a supply voltage which supplies the sensor system under consideration. An abscissa 512 describes the time in this case. The supply voltage of the sensor system is plotted on an ordinate 514. A first curve 516 shows the temporal profile of the supply voltage, which has a dip 518. The dip in the supply voltage thus represents a disturbance.

A second temporal illustration 530 describes the output data supplied by the sensor system under consideration as a response to the dip 518 (disturbance) in the voltage supply. An abscissa 532 shows the time. An ordinate 534 describes the output data at an output of a holding element of the sensor system with the holding element according to one embodiment that is under consideration. A second curve 536 describes the temporal profile of the output data, the output data having a dip 538.

The second temporal illustration 530 thus shows a possible behaviour of a sensor system with a holding device according to one embodiment and with an output voltage that is ratiometric with respect to the supply on account of a supply voltage dip 518. As can be seen from the second temporal illustration 530, the output data present at the output of the sensor system under consideration firstly follow the dip 518 in the supply voltage, which is to be expected. On account of the dip 518 in the supply voltage, internal function blocks of the sensor system have to be reinitialized as a safety feature, since the dip 518 is so great that the dip 518 might lead to functional inconsistencies. Especially if the sensor system under consideration can only be equipped with few control lines, it may be problematic to forward the state of the reinitialization externally.

As shown in the second temporal illustration 530, the sensor system with a holding device may have a desired behaviour, however, in the case of which a downstream system connected to the output of the sensor system experiences no further impairment whatsoever on account of the dip 518 in the supply voltage (generally: the disturbance). Since reliable further measurement cannot be taken into account during a reinitialization or a restart of the sensor system under consideration, a value can be held at the output of the sensor system during the restart. This task can be fulfilled by the holding device according to one embodiment.

Figure 12:
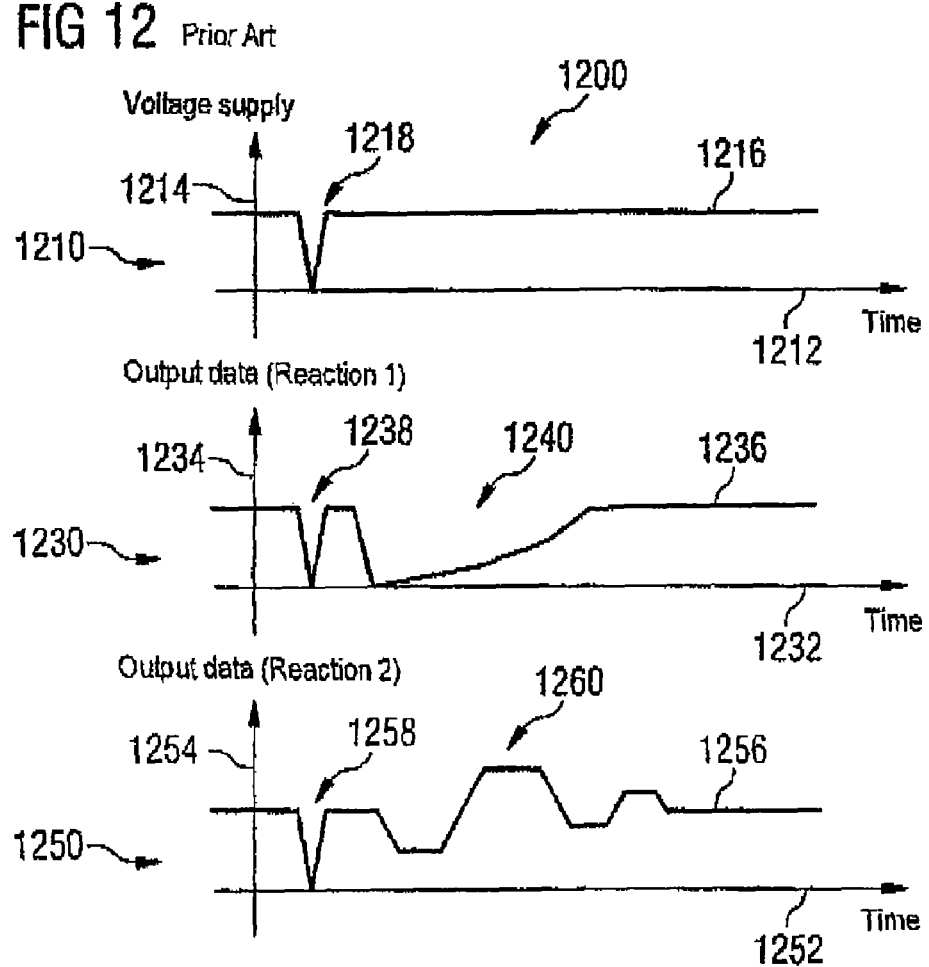
FIG. 12 shows a graphical illustration of conventional output data of conventional exemplary sensor signals as a response to a disturbance of the voltage supply.

It should be pointed out here that the behaviour of a sensor system with a holding device may differ significantly from the behaviour of conventional sensor systems without a holding device as shown with reference to FIG. 12. This is because a sensor system with a holding device may not have an undesirable start-up 1240 or an undesirable attenuated oscillation 1260 of the output signal (output data) present at the output of the sensor system. Rather, a sensor with a holding device may have only a short dip 538 in the signal at the output of the sensor system (output data), which stems from the ratiometric principle of the sensor system under consideration.

Figure 6:
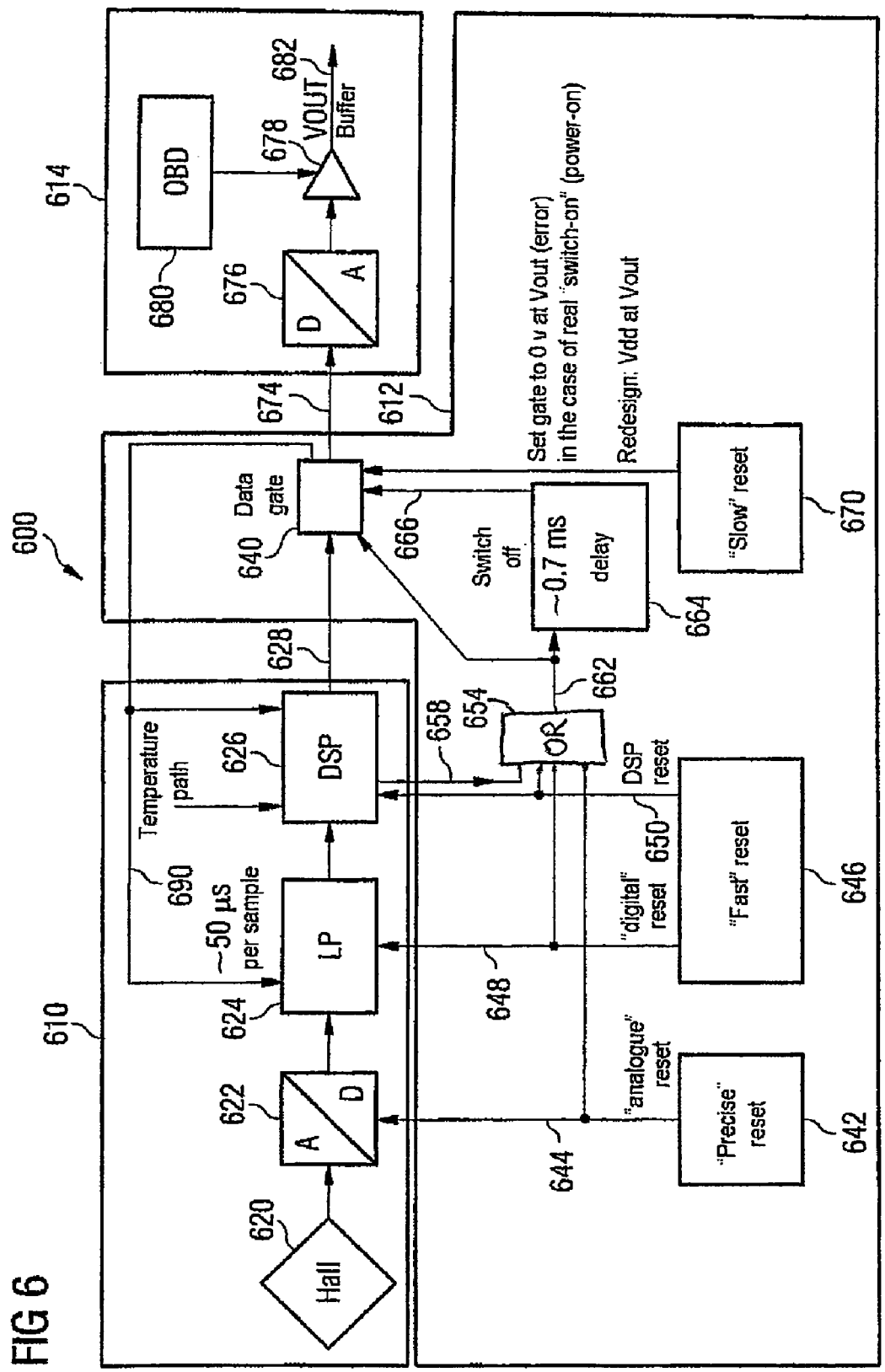
FIG. 6 shows a simplified block diagram of a sensor system with a holding device in accordance with a third exemplary embodiment.

FIG. 6 shows a simplified block diagram of a sensor system with a holding device in accordance with a third exemplary embodiment. The sensor system shown in FIG. 6 is designated in its entirety by 600. The sensor system 600 comprises a sensor 610, a holding device 612 and also an interface device 614. The sensor 610 comprises a Hall element 620, which supplies an output signal to an analogue-to-digital converter 622. A digital output signal of the analogue-to-digital converter 622 is fed to a digital filter 624. The digital filter may be a low-pass filter, by way of example. The digital filter 624 may for example spend approximately 50 µs per sample or have a signal delay of approximately 50 µs. In other words, the digital filter 624 can read in or process a sample approximately every 50 µs. An output signal of the digital filter 624 is fed to a digital signal processor 626. The digital signal processor 626 furthermore receives, via a temperature path, an item of information about the temperature of the sensor. The digital signal processor 626 finally outputs a sensor signal 628. The sensor signal 628 describes the measurement quantity evaluated by the sensor 610 or the measurement data determined and is fed to a data gate 640 of the holding device 612. The data gate 640 may also be regarded as a storage device.

The holding device 612 furthermore comprises a first resetting device 642, which is also designated as "precise reset". The first resetting device 642 supplies an "analogue" reset signal 644 to the analogue-to-digital converter 622. The holding device 612 furthermore comprises a second resetting device 646, which is also designated as "fast reset". The second resetting device 646 supplies a "digital" reset signal 648 to the digital filter 624. The second resetting device 646 furthermore supplies a DSP reset signal 650 to the digital signal processor 626.

The holding device 612 furthermore comprises an OR logic element (OR gate) 654. The OR logic element 654 receives the "analogue" reset signal 644, the "digital" reset signal 648 and the DSP reset signal 650. Furthermore, the OR logic element 654 optionally receives an error signal 658 from the digital signal processor 626. An output signal 662 of the OR logic element 654 is fed to the data gate 640. Furthermore, the output signal 662 of the OR logic element is fed to a delay circuit 664. The delay circuit 664 generates a delayed signal 666, which is fed in the same way as the output signal 662 of the OR logic element to the data gate 640. The output signal 662 of the OR logic element and the delayed signal 666 may both act to turn off the refresh (update) of the data gate 640.

The holding device 612 furthermore comprises a third resetting device 670, which is also designated as "slow reset". The third resetting device 670 acts directly on the data gate 640. The third resetting device 670 is designed to set the data gate in such a way that an output voltage Vout of the sensor system is 0 volts if the sensor is really switched on (real power-on), that is to say if the supply voltage of the sensor system was interrupted for a relatively long period of time. However, it is also possible to set the output voltage Vout to the supply voltage Vdd (the supply voltage of the sensor system) if a real switch-on (real power-on) is present.

The sensor system 600 comprises an interface device 614, as already mentioned. The interface device 614 receives a held sensor signal 674 from the data gate. The held sensor signal 674 is present as a digital signal and is fed to a digital-to-analogue converter 676 that is part of the interface device 614. An output signal of the digital-to-analogue converter 676 is finally fed to an output amplifier 678. The output amplifier 678 furthermore receives a signal from an on-board diagnosis device 680. The output amplifier (or output buffer) finally generates an output signal 682 of the sensor system.

On the basis of the structural description of the sensor system 600, the functioning of the sensor system 600 is described below. In this case, the sensor 600 supplies a sensor signal 628 during normal operation, which sensor signal is fed to the data gate 640. If the first resetting device 642 ("precise reset") identifies a slight fluctuation of a supply voltage of the sensor 610, then the first resetting device 642 thereupon triggers a reset. A reset can also be triggered by the second resetting device 646 in a similar manner. It should be noted, however, that the first resetting device 642 identifies a deviation of the supply voltage of the sensor 610 only when said deviation is present over a comparatively long period of time. By contrast, the second resetting device 646 ("fast reset") identifies dips or overvoltage spikes in the supply voltage of the sensor 610 even when these are present only for a comparatively short time, although a deviation of the supply voltage from a desired value must be greater than is necessary for identification by the first resetting device 642. In other words, the first resetting device 642 monitors the compliance with the permissible operating voltage range of the operating voltage of the sensor 610 comparatively precisely (more precisely than the second resetting device 646), but responds comparatively slowly (more slowly than the second resetting device 646) if the operating voltage of the sensor 610 leaves a permissible range.

In other words, the first resetting device 642 can only identify comparatively long (longer than the second resetting device 646) dips in the supply voltage or overvoltage spikes. Conversely, the second resetting device 646 only identifies comparatively great deviations of the supply voltage of the sensor 610 from a permissible range, that is to say that the second resetting device 646 becomes active only in the event of greater deviations than the first resetting device 642. However, the second resetting device 646 responds faster to voltage dips and overvoltage spikes in the supply voltage of the sensor 610 and can thus identify shorter disturbances than is possible for the first resetting device 642.

It shall be mentioned as an example here that, by way of example, the first resetting device 642 identifies a slow decrease in the supply voltage which cannot be identified by the second resetting device 646. In contrast thereto, the second resetting device 646, by way of example, identifies a very short but strong pulse on the supply voltage of the sensor 610 which could not be detected by the first resetting device 642. Moreover, it should be pointed out that the first resetting device 642 and the second resetting device 646 can monitor one or a plurality of operating voltages of the sensor 610. Furthermore, it shall be specified as an example here that the second resetting device only identifies voltage fluctuations which amount to at least 20% of the nominal supply voltage of the sensor 610.

The first resetting device 642 and the second resetting device 646 thus serve as monitoring circuits for a supply voltage of the sensor 610 or a plurality of supply voltages of the sensor 610. Moreover, it should be noted that the first resetting device 642 and the second resetting device 646 may be regarded as reset circuits of the system itself since they are responsible for the resetting of the analogue-to-digital converter 622, of the digital filter 624 and of the digital signal processor 626. If a disturbance occurs on a supply voltage of the sensor 610 which no longer permits reliable operation of the sensor 610, then at least one of the resetting devices 642, 646 becomes active. The activation of the first resetting device 642 or of the second resetting device 646 results in an active output signal 662 of the OR logic element. The output signal 662 of the OR logic element acts on the data gate 640 and has the effect that the data gate 640 is closed, that is to say that the data gate 640 no longer permits the updating of a storage element contained in the data gate 640 with the sensor signal. If, therefore, the output signal 662 of the OR logic element becomes active, then the data gate 640 retains an instantaneous storage content. Therefore, erroneous data can no longer be accepted from the digital signal processor 626.

Furthermore, the delay circuit 664 has the effect that the data gate 640 also remains closed for a duration of a delay (for example approximately 0.7 ms) effected by the delay circuit 664 after both the first resetting device 642 and the second resetting device 646 (and hence the "analogue" reset signal 644 and the "digital" reset signal 648) have become inactive. In other words, the OR logic element 654 and the delay effected by the delay circuit 664 have the consequence that the data gate 640 is closed in the error case for a predefined minimum time (which is equal for example to the delay time of the delay circuit 664). It should also be noted in this case that the data gate 640 is closed if at least one of the output signals 662 of the OR logic element or the delayed signal 666 is active. Furthermore, it should be noted that the delayed signal 666 is preferably activated by the output signal 662 of the OR logic element and remains active beyond the end of the output signal 662 of the OR logic element for a predefined time duration (or turn-off delay time).

It should furthermore be noted that an activation of the data gate 640 (that is to say a closing of the data gate, so that the data gate retains a signal value and does not accept a new signal value of the sensor signal 628) in an error case must be effected more rapidly than the data processing rate of the signal processing unit (comprising for example the digital signal processor 626, the digital filter 624 and the analogue-to-digital converter 622). An error case is in this case assumed to be voltage dips on the supply of the signal processing unit or of the sensor 610 which necessitate a reinitialization of the digital part. It can thereby be ensured that the data gate 640 does not accept a data word of the sensor signal 628 that has been made invalid by a voltage dip or a voltage spike in the supply voltage of the sensor 610.

The circuit arrangement according to one embodiment, comprising a data gate 640, can ensure that a last valid signal value (datum) is held in the data gate while the digital circuits of the sensor 610 ("digital part") are initialized.

It should furthermore be pointed out that the data gate 640 may be interpreted as a holding element, and that the data gate 640 comprises for example simple resettable and loadable digital registers.

A few further details of the sensor system 600 are described more specifically below. The third reset circuit 670 ("slow reset") acts on the data gate 640 and is designed to identify lengthier interruptions of a supply voltage of the sensor system 600 or of the sensor 610. By way of example, the third resetting device 670 may have a time constant of approximately 0.5 ms and thus identify interruptions of the supply voltage which lasts longer than 0.5 ms. In the case of such a design, the third resetting device 670 can identify if the entire sensor system 600 was switched off and is switched on again for the first time after an operating pause of the order of magnitude of at least 0.5 ms to 1 ms. Consequently, the third resetting device 670 does not detect short dips in the supply voltage (shorter than approximately 0.5 ms). Short fluctuations of the supply voltage are identified for example by the second resetting device 646. It should also be noted in this case that the time constant of the third resetting device 670 is preferably shorter than the time constant of the delay circuit 664.

The third rest circuit 670 may be realized for example by an R-C element having a high time constant in conjunction with a Schmitt trigger. The third reset circuit 670 thus initializes the data gate 640 during a first switch-on ("power-on reset" or "real power-on"). In this case, the data gate 640 is preferably designed in such a way that the data gate is set by a signal from the third resetting device 670 in such a way that the output signal 682 (Vout) in the case of a real switch-on process (real power-on) is switched to 0 volts, which indicates to a downstream system an error state, that is to say a state in which the output signal does not supply reliable measurement data (bug). However, the data gate 640 may also be designed in such a way that the output signal 680 (Vout) is set to the supply voltage Vdd of the sensor or of the interface device 614 if the third resetting device 670 indicates an initial switch-on of the supply voltage after a lengthy switched-off state.

The sensor system 600 may furthermore have an optional on-board diagnosis device 680, which acts on the output driver 678. The on-board diagnosis device can identify, for example, whether one of the supply lines or signal lines is broken. Furthermore, the on-board diagnosis device can check the proper operation of all the devices contained in the sensor system. If the on-board diagnosis device 680 ascertains an error, then it can set the output signal 682 to a predefined value (e.g. 0 volts or the supply voltage Vdd), so that an evaluation circuit connected to the sensor system 600 can identify the error state.

Furthermore, it is possible for the digital signal processor 626 to be designed to activate the error signal 658 in an error case, the error signal 658 being fed to the OR logic element 654. Therefore, if the digital signal processor has an error, then the output signal 662 of the OR logic element becomes active, as a result of which a refresh (update) of the data gate 640 is turned off. Moreover, the delay circuit 664 ensures that an updating of the data gate 640 is also retained for a predefined time (e.g. 0.7 ms) after the end of the error case, so that the digital signal processor 662 has already assumed a settled state (or is reinitialized) if an updating of the data gate 640 is enabled again.

Finally, it should be pointed out that the digital filter 624 has a certain delay (e.g. 50 µs). After the occurrence of an error condition, that is to say for example after the activation of the analogue reset signal 644, of the digital reset signal 648, of the DSP reset signal 650 or of the error signal 658, the data gate 640—within a period of time which is less than the delay of the digital filter 624—must be put into a state in which an updating is no longer effected. If the digital signal processor 626 also has a specific delay time, then the data gate 640 must once again be brought to the state in which an updating is not effected before the delay time of the digital signal processor 626 has elapsed.

The sensor system 600 shown furthermore has a feedback signal 690. The feedback signal 690 is made available by the data gate 640. If an error case occurs, so that the digital filter 624 and the digital signal processor 626 therefore have to be reset or reinitialized, then the feedback signal 690, which represents the signal value stored in the data gate 640, can be used to accelerate the reinitialization of the digital filter 624 or of the digital signal processor 626. This is because the data gate 640 contains the last valid value of the sensor signal 628. If the digital part (comprising the digital filter 624 and the digital signal processor 626) is disturbed only for a short time, the signal value stored in the data gate 640 approximates well to the present measured value after a reset. The feedback signal 690 or the signal value stored in the data gate 640 can thus be entered into one or a plurality of registers of the digital filter 624 or of the digital signal processor 626 as initial values for a reinitialization. Moreover, suitable initial values for the digital filter 624 or the signal processor 626 can be derived from the feedback signal by means of a further processing. Consequently, the digital filter 624 or the digital signal processor 626 does not start with arbitrary values after a reset, but rather with the signal value stored in the data gate 640 or signal values derived therefrom in a systematic manner. As a result, a start-up of the digital filter 624 or of the digital signal processor 626 is significantly accelerated since the initial value is significantly closer to the actual value than would be the case with an arbitrary resetting of the registers in the digital filter 624 or the digital signal processor 626.

In other words, the data gate 640 forms a so-called "recovery latch" for the digital filter 624 or the digital signal processor 626. Data from the recovery latch which contains the last valid signal value prior to a disturbance of the supply voltage or prior to a resetting of the digital filter 624 or of the digital signal processor 626 can be utilized for an initialization of the digital filter 624 or of the digital signal processor 626. Moreover, the recovery latch can also store analogue values and feed these, if appropriate, to an analogue filter as start values. A digital filter 624, a signal processor 626 or else an analogue filter can settle more rapidly using the signal values stored in the recovery latch. The data gate 640 which stores the last valid signal value of the sensor signal 628 is very highly suitable as a recovery latch. However, a recovery latch may also be contained internally in the digital signal processor 626 or the digital filter 624, store internal data of the digital filter 624 or of the digital signal processor 626 and make them available to the digital filter 624 or the digital signal processor 626 in the event of a possibly required reinitialization.

In other words, the digital signal processor 626 may contain a recovery latch comprising a storage element which stores the data stored in it for a specific time independently of a supply voltage of the digital signal processor. The recovery latch in the digital signal processor is continuously updated as long as it is ensured that the data present in the digital signal processor are valid. If a disturbance of the digital signal processor occurs, then the updating of the recovery latch is immediately prevented, and the recovery latch contains a signal value which is identical to the last reliable value in a predefined register of the digital signal processor. In the event of a reinitialization of the digital signal processor, the signal value stored in the recovery latch is then fed to the predefined register of the digital signal processor once again as initial value, in which case a reset signal may initiate the transfer of the signal value from the recovery latch into the predefined register of the digital signal processor. A driving of the recovery latch may be effected in a similar manner to a driving of the data gate 640.

Figure 7:
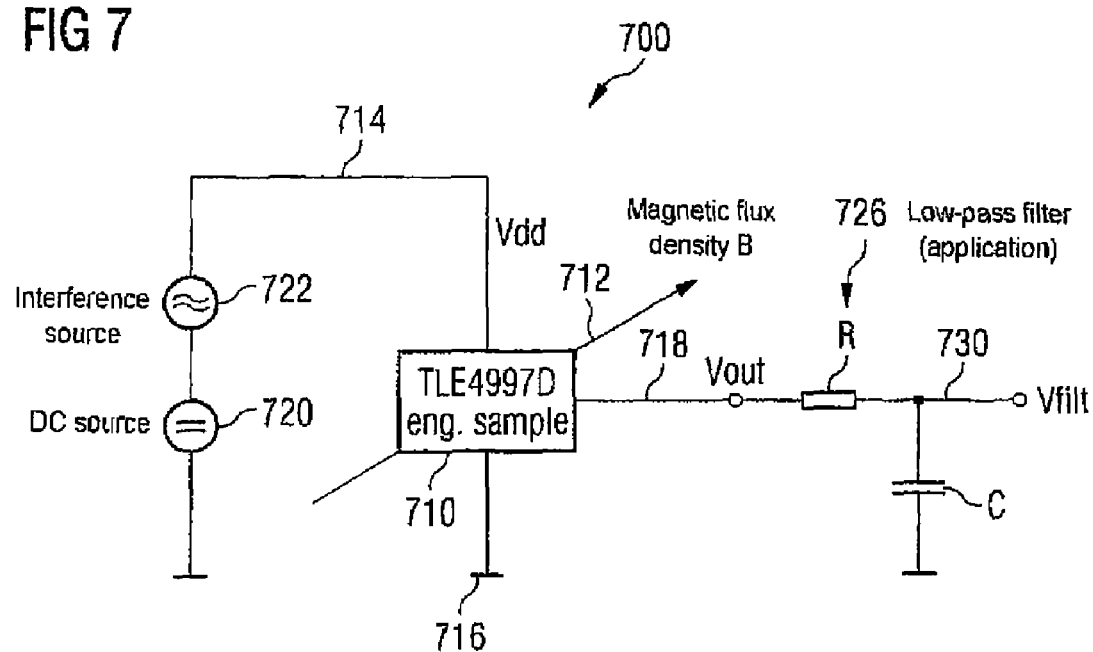
FIG. 7 shows a block diagram of a measurement setup for testing a sensor system with a holding device.

FIG. 7 shows a block diagram of a measurement set up for testing a sensor system with a holding device. The measuring circuit shown in FIG. 7 is designated in its entirety by 700. The measurement setup 700 comprises a magnetic field sensor 710. The latter is permeated by a magnetic field 712 having the magnetic flux density B. The magnetic field sensor 710 has a supply voltage terminal 714, to which a supply voltage Vdd is applied. Furthermore, the magnetic field sensor 710 has a reference potential terminal 716 and also an output terminal 718. The supply voltage Vdd supplied by a DC voltage source 720 is present at the supply voltage terminal 714. The DC voltage source 720 is connected in series with an interference source 722 between the supply voltage terminal 714 and the reference potential terminal 716 of the magnetic field sensor 710. An output voltage Vout is available at the output terminal 718 of the magnetic field sensor 710. The output terminal 718 of the magnetic field sensor 710 is furthermore coupled to a low-pass filter 726 comprising a series resistance R and a shunt capacitance C. A low-pass-filtered output voltage Vfilt is available at an output 730 of the low-pass filter 726.

The measurement setup 700 thus comprises overall a sensor system which has been constructed with a corresponding circuit arrangement and has been exposed to a disturbance by means of the interference source 722.

It is furthermore pointed out that the magnetic field sensor 710 under consideration is a linear Hall sensor with a ratiometric output. This means that the output signal Vout at the output terminal 718 of the magnetic field sensor 710 corresponds to a ratio (or fraction) of the supply voltage Vdd of the magnetic field sensor 710 that corresponds to the magnetic flux density B of the magnetic field 712.

An investigation was carried out to determine how the output signal Vout at the output terminal 718 of the magnetic field sensor 710 reacts to an interference pulse superposed on the supply voltage Vdd, given a constant measurement quantity B (magnetic field strength).

FIG. 8a shows a graphical illustration of measurement results on a sensor system with a holding device according to an embodiment. The graphical illustration of FIG. 8a is designated in its entirety by 800. The measurements shown in FIG. 8a were recorded, moreover, using the measurement setup 700 shown in FIG. 7.

The graphical illustration 800 shows a multichannel oscillogram. A time is plotted in a horizontal direction 810, while voltage levels are plotted in a vertical direction 812. A first curve 820 describes the temporal profile of the voltage at the supply voltage terminal 714 of the magnetic field sensor 710, a disturbance 822 being superposed on the supply line for the supply voltage Vdd. A second curve 824 describes the output signal Vout at the output terminal 718 of the magnetic field sensor 710. A third curve 828 furthermore describes the low-pass-filtered output signal Vfilt downstream of the low-pass filter 726, which may also be interpreted as an application circuit.

FIG. 8b shows a further graphical illustration of measurement results on a sensor system with a holding device according to an embodiment. The graphical illustration of FIG. 8b is designated in its entirety by 850 and differs from the graphical illustration 800 of FIG. 8a merely by virtue of a changed time scale. Therefore, identical reference symbols in FIG. 8a and FIG. 8b designate identical axes and curves.

It can be seen from the graphical illustrations 800 and 850 that a high-frequency interference pulse having an amplitude of approximately 4.5 volts is impressed on the supply voltage Vdd at the supply voltage terminal 714. On account of the ratiometric principle of the magnetic field sensor 710, the output signal Vout at the output terminal 718 of the magnetic field sensor 710 attempts to follow the disturbance on the supply voltage Vdd. This behaviour is afforded systematically (radiometric principle). However, since the disturbance has a higher frequency than required for the application of the magnetic field sensor, the output signal Vout at the output terminal 718 of the magnetic field sensor 710 follows the disturbance on the supply voltage Vdd not even approximately exactly. Furthermore, it can be established that the output signal Vout at the output terminal 718 of the magnetic field sensor 710 reverts immediately or within less than 50 µs after the end of the disturbance 822 on the supply voltage Vdd to an output value again which the output signal Vout had assumed prior to the beginning of the disturbance (cf. second curve 824).

The low-pass-filtered output signal Vfilt has a disturbance whose amplitude is distinctly smaller than the amplitude of the disturbance on the output signal Vout. However, the low-pass-filtered output signal Vfilt requires distinctly longer to revert to the output value that was present prior to the beginning of the disturbance than the output signal Vout at the output 718 of the magnetic field sensor 710.

The graphical illustrations 800, 850 of FIGS. 8a and 8b show the a crucial feature of the magnetic field sensor 710 with a holding device: the output voltage Vout reverts subsequent to a disturbance of the supply voltage Vdd after a reset immediately (or within an extremely short time) to the old value again which the output signal Vout had prior to the beginning of the disturbance of the supply voltage Vdd.

It is evident that the output terminal 718 is held at the previously measured value even after a disturbance of the supply voltage Vdd. This can be achieved by means of the above-described design. A momentary deviation of the output signal Vout from the value present prior to the beginning of a disturbance is only caused by the digital-to-analogue converter 676 and the output driver 678.

The sensor system can therefore conceal a disturbance occurring on the supply voltage Vdd from a further processing system. This is particularly advantageous if the occurrence of the disturbance and the transient recovery of the sensor are very short in comparison with a change in the measurement quantity of the process. In other words: if the measurement quantity of the process changes only little during a momentary disturbance and during the transient recovery of the sensor, it is advantageous to conceal the disturbance from the further processing system.

FIG. 9 shows a flowchart of a method in accordance with a fourth exemplary embodiment. The flowchart is designated in its entirety by 900. The method can be designed to forward a sensor signal using a storage device. In this case, it is assumed that the storage device is designed to store a signal value for a period of time which is longer than a predefined first period of time, independently of a supply voltage of the storage device.

The method may comprise receiving a sensor signal from a sensor in a first step 910. A second step 920 then involves checking whether the sensor signal is valid. In a third step 930, the signal value stored in the storage device is updated based on the sensor signal if it is ensured that the received sensor signal is valid. In this case, it is pointed out that an updating can be effected only when the validity of the received sensor signal is ensured. The signal value stored in the storage device is then output in a fourth step 940.

The method may thus ensure that the signal value present in the storage device is valid, and that consequently only valid signal values, too, are output.

Depending on the conditions, the method may be implemented in hardware or in software. The implementation may be effected on a digital storage medium, in particular a floppy disk or CD, with control signals which can be read out electronically and which can interact with a programmable computer system in such a way that the corresponding method is performed. Generally, the invention thus also consists in a computer program product having program code stored on a machine-readable carrier and serving for carrying out the method if the computer program product is executed on a computer. To put it another way, the invention can thus be realized as a computer program having a program code for carrying out the method if the computer program is executed on a computer.

Finally, it is also pointed out that the recovery latch concept described can also be applied very generally in an arbitrary digital or analogue data processing device. Thus, data which occur within a digital or analogue data processing device can be stored in a digital or analogue latch (storage device). If this storage device is designed in such a way that it retains the data stored in it even after a failure of a supply voltage of the data processing device, then the data stored in the latch can be used during a reinitialization of the data processing device. If a reset of the data processing device is necessary, then the data processing device can carry out the initialization using the data stored in the data latch. In contrast to conventional data processing devices, consequently, the initialization is not carried out with arbitrary data, but rather with data which were held in the latch during a disturbance or during a momentary failure of a supply voltage.

The data processing device may also be a sub-block of a more complex data processing system. By way of example, a register in a digital signal processor which stores an intermediate result may be provided with a data latch. That is to say that the register of the digital signal processor regularly transfers data into the data latch, which is in turn designed in such a way that it retains the data stored in it for a certain time independently of the supply voltage of the digital signal processor. If a disturbance of the digital signal processor (for example a disturbance of the supply voltage of the digital signal processor) occurs, so that the digital signal processor or a sub-block of the digital signal processor which contains the register has to be reset, then the data stored in the data latch can be loaded back into the register after the end of the disturbance. Furthermore, in the disturbance case it is possible to identify whether a long or a short disturbance is involved (a short disturbance being a disturbance which is shorter than a predefined time duration). In the case of a short disturbance, the register of the signal processor can be set to the value stored in the data latch after the end of the disturbance, while in the case of a long disturbance the register of the signal processor can be set to a predefined value after the end of the disturbance. Furthermore, it must be emphasized that the data latch is driven by a control circuit in such a way that the data latch can be updated only when the signal processor is in a stable operating state, that is to say when the data in the register are valid and/or the supply voltage of the signal processor is stable.

Instead of a digital signal processor, it is also possible, of course, to use an analogue or digital filter or a conventional processor. The data latch (also referred to as data gate) can store digital or analogue values as long as it is ensured that the data latch can carry out this storage for at least a certain time duration independently of the supply voltage. Through the use of the data stored in the data latch during an initialization of a signal processing device, the time duration required for the initialization can be significantly reduced.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. A holding device for a sensor signal from a sensor, comprising:
   a signal input receiving the sensor signal from the sensor;
   a signal output;
   a memory, which is coupled to the signal input and the signal output, the memory being operable in a first state to retain a stored signal value and prevent an updating of the stored signal value, and in a second state to update the stored signal value, wherein the updated stored signal value is based on the sensor signal, and wherein the memory is operable in the first state to retain the stored signal value for a time period that is greater than a first predetermined time duration, independently of a supply voltage of the memory, and wherein the memory comprises:
      a memory cell; and
      a switch or a switchable driver connected between an input of the memory and the memory cell, and configured to enable or disable the input of the memory, wherein any write access to the memory is blocked if the switch is open or the switchable driver is disabled during the first state; and
   a monitor, which is effectively coupled to the memory, and operable to determine whether the sensor signal present at the signal input is valid, and to ensure that the memory is in the second state only when the monitor identifies that the sensor signal at the signal input is valid,
   wherein the monitor is further operable to drive a control signal in such a way that an acceptance of data by the memory is possible only when the monitor has determined that the sensor signal is valid, wherein a state of the switch or switchable driver is controlled based on the control signal, and wherein the holding device is furthermore operable to output the signal value presenting the memory at the signal output.

2. The holding device according to claim 1, wherein the monitor is operable to identify the sensor signal as invalid whenever a supply voltage of the sensor has a disturbance.

3. The holding device according to claim 1, wherein the monitor is operable to identify the sensor signal as invalid whenever a supply voltage of the sensor has a temporal change which is faster than a predetermined temporal change.

4. The holding device according to claim 1, wherein the memory is furthermore operable to set the stored signal value to a predetermined precharge value as a response to a precharge signal.

5. The holding device according to claim 1, wherein the memory is operable to store the signal value independently of an interference pulse on the supply voltage of the memory.

6. The holding device according to claim 1, wherein the monitor is operable to monitor whether the sensor has a disturbance, and to ensure that the memory is in the second state only when the sensor has no disturbance.

7. The holding device according to claim 1, wherein the monitor is operable to monitor an operating voltage of the sensor, and to ensure that the memory is in the second state only when the operating voltage of the sensor is in a permissible operating voltage range.

8. The holding device according to claim 1, wherein the memory is an analogue holding element comprising a capacitor that is decoupled from the signal input in a passive basic state.

9. The holding device according to claim 1, wherein the memory is a digital holding element that is decoupled from the signal input in a passive basic state.

10. The holding device according to claim 1, wherein the memory comprises at least on electrical charge store that is decoupled from the signal input in the passive basic state by means of at least one opened switch.

11. The holding device according to claim 1, wherein the memory is operable to update the signal value based on the sensor signal in the second state if the sensor indicates a presence of a new signal value of the sensor signal by means of an acceptance signal.

12. The holding device according to claim 1, wherein the monitor is operable, given the presence of an invalid sensor signal at the signal input, to bring the memory into the first state so rapidly that the invalid sensor signal is not accepted into the memory.

13. The holding device according to claim 1, wherein the holding device is furthermore operable to output the signal value to a signal conditioner of the sensor in order to enable an accelerated initialization of the sensor.

14. The holding device according to claim 1, wherein the monitor is operable to monitor an operating voltage of the sensor and to put the memory into the first state if a disturbance occurs on the operating voltage of the sensor, and to hold the memory in the first operating state for a predetermined time after the end of the disturbance on the operating voltage of the sensor.

15. The holding device according to claim 14, wherein the predetermined time is greater than a transient recovery time of the sensor, the transient recovery time of the sensor being a time duration required by the sensor until, after the end of a disturbance on the operating voltage of the sensor, the sensor signal attains a stable and reliable value.

16. The holding device according to claim 1, wherein the memory is operable to retain the stored signal value in a passive basic state, and to enable updating of the stored signal value based on the sensor signal in an active state.

17. The holding device according to claim 16, wherein the memory is operable to assume the passive basic state if a supply voltage of the memory falls below a predetermined minimum voltage.

18. The holding device according to claim 1, wherein the monitor comprises a first resetter, which is operable to monitor an operating voltage of an analogue circuit part of the sensor, and to reset the analogue circuit part if the operating voltage of the analogue circuit part meets a first disturbance condition, the monitor furthermore being operable to ensure that the memory is not in the second operating state while the first resetter resets the analogue circuit part of the sensor, the operating voltage of the analogue circuit part meeting the first disturbance condition if reliable operation of the analogue circuit part is not ensured on account of a disturbance on the operating voltage of the analogue circuit part.

19. The holding device according to claim 18, wherein the monitor comprises a second resetter, which is operable to monitor an operating voltage of a digital circuit part of the sensor, and to reset the digital circuit part if the operating voltage of the digital circuit part meets a second disturbance condition, the monitor furthermore being operable to ensure that the memory is not in the second operating state while the second resetter resets the digital circuit part of the sensor, the operating voltage of the digital circuit part meeting the second disturbance condition if reliable operation of the digital circuit part is not ensured on account of a disturbance on the operating voltage of the digital circuit part.

20. The holding device according to claim 19, wherein the first disturbance condition is met if the operating voltage of the analogue circuit part has at least one small deviation from a desired value over a long time period, and the second disturbance condition is met if the operating voltage of the digital circuit part has a large deviation from a desired value at least over a short time period.

21. The holding device according to claim 19, wherein the monitor is operable to hold the memory in the first state for a predetermined time duration after an end of the resetting of the analogue circuit part and of the digital circuit part.

22. The holding device according to claim 19, wherein the monitor furthermore comprises a third resetter, which is operable to identify whether a lengthy disturbance of the operating voltage of the holding device or of the sensor with a duration longer than a predetermined time duration was present, and to set the signal value of the memory to the predetermined precharge value if the lengthy disturbance of the operating voltage of the holding device or of the sensor was present.

23. The holding device according to claim 22, wherein the third resetter comprises an R-C element and a Schmitt trigger coupled to the R-C element, an output signal of the Schmitt trigger forming a precharge signal that is formed to precharge the signal value of the memory to the specific precharge value.

24. A method for forwarding a sensor signal using a memory operable to store a signal value for a time period which is longer than a predetermined first time duration, independently of a supply voltage of the memory, wherein the memory comprises a memory cell, and a switch or switchable driver connected between an input of the memory and the memory cell, comprising the steps of:
- receiving the sensor signal from a sensor;
- checking whether the sensor signal is valid;
- updating the value of the sensor signal stored in the memory, wherein the undated sensor signal value is based on the sensor signal, wherein the updating is performed only if it is ensured that the received sensor signal is valid;
- wherein updating the value of the sensor signal stored in the memory comprises controlling the switch or switchable driver to enable the input of the memory, wherein otherwise any write access to the memory is blocked if the switch is open or the switchable driver is disabled,
- wherein updating the value of the sensor signal stored in the memory comprises providing a control signal in such a way that an acceptance of data by the memory is possible only when it has been found that the sensor signal is valid, and
- wherein the state of the switch or switchable driver is controlled based on the control signal; and
- outputting the signal value stored in the memory.

25. The method according to claim 24, furthermore comprising the step of:
- retaining the signal value in the memory as long as it is not ensured that the received sensor signal is valid.

26. The method according to claim 24, wherein checking whether the sensor signal is valid comprises monitoring an operating voltage of the sensor, it being assumed that the sensor signal is invalid if the operating voltage of the sensor has a disturbance.

27. The method according to claim 24, wherein checking whether the sensor signal is valid comprises monitoring an operating voltage of the sensor, it being assumed that the sensor signal is invalid for a predetermined time duration after an end of a disturbance of the operating voltage of the sensor.

28. The method according to claim 24, wherein checking whether the sensor signal is valid comprises monitoring whether a disturbance of the sensor is present, it being assumed that the sensor signal is invalid if a disturbance of the sensor is present.

29. The method according to claim 24, furthermore comprising:
- using a sensor comprising a resettable digital circuit part; and
- resetting the digital circuit part of the sensor if an operating voltage of the digital circuit part meets a second disturbance condition, it being assumed that the sensor signal is invalid during the resetting of the digital circuit part.

30. The method according to claim 24, furthermore comprising setting the signal value to a predetermined signal value if a disturbance of an operating voltage of the sensor which is longer than a predetermined time duration is identified.

31. The method according to claim 24, wherein the signal value stored in the memory is updated in response to an activation of an acceptance signal supplied by the sensor.

32. The method according to claim 24, furthermore comprising the use of the stored signal value in an initialization of the sensor.

33. The method according to claim 24, furthermore comprising:
- using a sensor comprising a resettable analog circuit part; and
- resetting the analogue circuit part of the sensor if an operating voltage of the analogue circuit part meets a first disturbance condition, it being assumed that the sensor signal is invalid during the resetting of the analogue circuit part.

34. The method according to claim 33, wherein it is furthermore assumed that the sensor signal is invalid during the resetting of the analogue circuit part or of the digital circuit part and also for a predetermined second time duration after the conclusion of the resetting of the analogue circuit part or of the digital circuit part.

35. A holding device for a sensor signal from a sensor, comprising:
- a signal input receiving the sensor signal from the sensor;
- a signal output;
- a memory, which is coupled to the signal input and the signal output, the memory being operable in a first state to retain a stored signal value, and in a second state to update the stored signal value, wherein the updated stored signal value is based on the sensor signal, and wherein the memory is operable to retain the stored signal value for a time period that is greater than a first predetermined time duration, independently of a supply voltage of the memory;
- a monitor operatively coupled to the memory, and operable to determine whether the sensor signal present at the signal input is valid, and to ensure that the memory is in the second state only when the monitor identifies that the sensor signal at the signal input is valid,
- wherein the monitor comprises a resetter, which is operable to monitor an operating voltage of a digital circuit part of the sensor, and to reset the digital circuit part if the operating voltage of the digital circuit part meets a disturbance condition, wherein the monitor is further operable to ensure that the memory is not in the second state while the resetter resets the digital circuit part of the sensor, the operating voltage of the digital circuit part meeting the disturbance condition if reliable operation of the digital circuit part is not ensured on account of a disturbance on the operating voltage of the digital circuit part,
- wherein the disturbance condition is also met if the operating voltage of the analog circuit part has at least one small deviation from a desired value over a long time period, or if the operating voltage of the digital circuit part has a large deviation from a desired value at least over a short time period.

36. A holding device for a sensor signal from a sensor, comprising:
- a signal input receiving the sensor signal from the sensor;
- a signal output;
- a memory coupled to the signal input and the signal output, wherein the memory is operable in a first state to retain a stored signal value and to prevent an updating of the stored signal, and in a second state to update the stored signal value, wherein the updated stored signal value is based on the sensor signal, and wherein the memory is operable to retain the stored signal value for a time period that is greater than a first predetermined time duration, independently of a supply voltage of the memory,
- wherein the memory comprises an analog holding element comprising an input, a capacitor, and a switch, wherein the capacitor is selectively connected to the input of the memory via the switch, and wherein the capacitor is selectively decoupled from the input of the memory in the first state by means of the switch being open, such that a stored quantity in the capacitor is held during the first state;

a monitor operatively coupled to the memory, and operable to determine whether the sensor signal present at the signal input is valid, and to ensure that the memory is in the second state only when the monitor identifies that the sensor signal at the signal input is valid, and wherein the hold device is operable to output the signal value present in the memory at the signal output.

37. A holding device for a sensor signal from a sensor, comprising:

a signal input receiving the sensor signal from the sensor;

a signal output;

a memory coupled to the signal input and the signal output, wherein the memory is operable in a first state to retain a stored signal value, and in a second state to update the stored signal value, wherein the updated stored signal value is based on the sensor signal, and wherein the memory is operable to retain the stored signal value for a time period that is greater than a first predetermined time duration, independently of a supply voltage of the memory, wherein the memory comprises a latch having an input and an electrical charge store, and wherein the electrical charge store is decoupled from the signal input in the first state by means of at least one opened switching device, such that a charge can be held at a gate of a transistor even in the absence of a supply voltage; and a monitor operatively coupled to the memory, and operable to determine whether the sensor signal present at the signal input is valid, and to ensure that the memory is in the second state only when the monitor identifies that the sensor signal at the signal input is valid, wherein the holding device is further operable to output the signal value present in the memory at the signal output.

* * * * *